(12) United States Patent  
Tanaka et al.

(10) Patent No.: US 9,154,802 B2  
(45) Date of Patent: Oct. 6, 2015

(54) EMERGABLE WATERMARK SUPERIMPOSING METHOD, EMERGABLE WATERMARK SUPERIMPOSING APPARATUS, AND EMERGABLE WATERMARK SUPERIMPOSING SYSTEM

(75) Inventors: Yoshiyasu Tanaka, Yokosuka (JP); Takaaki Yamada, Sagamihara (JP); Yuzo Oshida, Yokohama (JP)

(73) Assignee: Hitachi Solutions, Ltd., Tokyo (JP)

( * ) Notice: Subject to any disclaimer, the term of this patent is extended or adjusted under 35 U.S.C. 154(b) by 704 days.

(21) Appl. No.: 13/336,445

(22) Filed: Dec. 23, 2011

(65) Prior Publication Data

US 2012/0163655 A1 Jun. 28, 2012

(30) Foreign Application Priority Data

Dec. 27, 2010 (JP) ................................. 2010-289118

(51) Int. Cl.  
*G06K 9/00* (2006.01)  
*H04N 19/467* (2014.01)

(52) U.S. Cl.  
CPC ................................. *H04N 19/467* (2014.11)

(58) Field of Classification Search  
None  
See application file for complete search history.

(56) References Cited

U.S. PATENT DOCUMENTS

| | | | | |
|---|---|---|---|---|
| 6,342,924 | B1 * | 1/2002 | Ikeda et al. | 348/473 |
| 6,959,101 | B2 * | 10/2005 | Yoshiura et al. | 382/100 |
| 7,227,661 | B2 * | 6/2007 | Matsunoshita | 358/1.15 |
| 7,359,087 | B2 | 4/2008 | Tanaka | |
| 2003/0076540 | A1 | 4/2003 | Hamashima et al. | |
| 2004/0145661 | A1 * | 7/2004 | Murakami et al. | 348/222.1 |
| 2006/0188012 | A1 | 8/2006 | Kondo | |
| 2007/0127056 | A1 * | 6/2007 | Hirano et al. | 358/1.14 |

* cited by examiner

*Primary Examiner* — Matthew Bella  
*Assistant Examiner* — Weiwen Yang  
(74) *Attorney, Agent, or Firm* — Foley & Lardner LLP

(57) ABSTRACT

In an emergable watermark superimposing method for superimposing a superimposition image on either a cover still image or a still image formed from a cover moving image, when an image after the superimposition image is superimposed thereon is converted, or a screen which displays thereon the image after the superimposition image is superimposed is photographed, the superimposition image is superimposed so as to be more emphasized.

10 Claims, 14 Drawing Sheets

FIG. 11

| $P_{k-1,l-1}$ | $P_{k,l-1}$ | $P_{k+1,l-1}$ | $P_{k+2,l-1}$ |
|---|---|---|---|
| $P_{k-1,l}$ | $P_{k,l}$ $P_{(u,v)}$ | $P_{k+1,l}$ | $P_{k+2,l}$ |
| $P_{k-1,l+1}$ | $P_{k,l+1}$ | $P_{k+1,l+1}$ | $P_{k+2,l+1}$ |
| $P_{k-1,l+2}$ | $P_{k,l+2}$ | $P_{k+1,l+2}$ | $P_{k+2,l+2}$ |

1/64

| +1 | -5 | -5 | +1 |
|----|-----|-----|----|
| -5 | +25 | +25 | -5 |
| -5 | +25 | +25 | -5 |
| +1 | -5 | -5 | +1 |

FIG. 13A
FIG. 13B
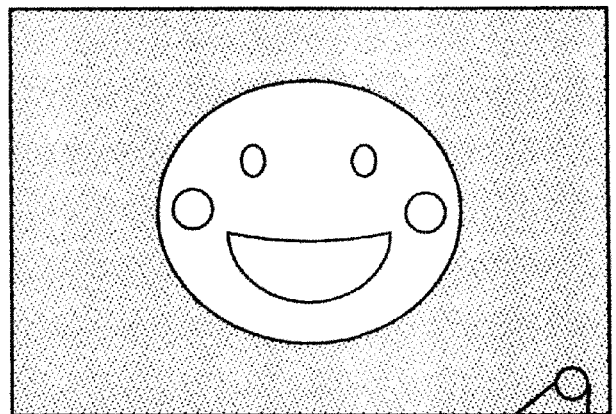
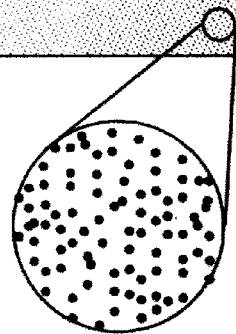
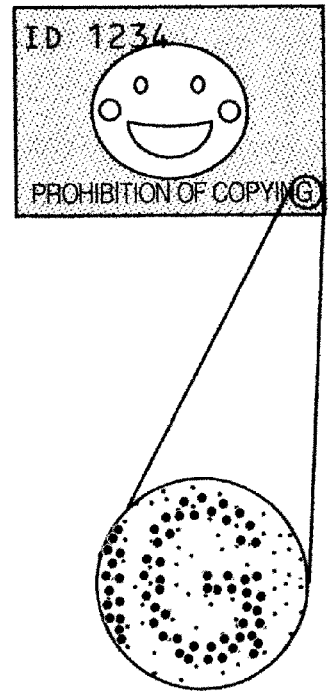
FIG. 14
| 10 | 20 | 30 | 20 | 10 |
|----|----|----|----|----|
| 10 | 30 | 50 | 30 | 10 |
| 30 | 50 | 50 | 50 | 30 |
| 10 | 20 | 30 | 20 | 10 |
| 10 | 10 | 10 | 10 | 10 |

EMERGABLE WATERMARK SUPERIMPOSING METHOD, EMERGABLE WATERMARK SUPERIMPOSING APPARATUS, AND EMERGABLE WATERMARK SUPERIMPOSING SYSTEM

INCORPORATION BY REFERENCE

The present application claims priority from Japanese application JP2010-289118 filed on Dec. 27, 2010, the content of which is hereby incorporated by reference into this application.

BACKGROUND OF THE INVENTION

1. Field of the Invention

The present invention is related to an emergable watermark superimposing method, an emergable watermark superimposing apparatus, and an emergable watermark superimposing system.

2. Description of the Related Art

Problems occur in infringement of copyright which is caused by illegally coping paper documents, and illegal acts (will be referred to as "attacks") with employment of elaborate copied articles, which can be actually realized due to progress in copying techniques.

As techniques capable of opposing these attacks, there are printing techniques for printing characters and the like which restrain copying of paper documents. That is, when the relevant paper documents are copied, for instance, characters such as "COPY" appear on copied documents, which clearly indicate that the copied documents constitute copied articles. The above-described printing techniques are utilized m, for example, certificates and the like which are issued by self-governing bodies.

As publications for disclosing the above-described techniques, for instance, U.S. Pat. No. 7,359,087 specification is present. This publication describes "In a print control apparatus 1 that has a printing device 6 to print a document, a CPU 2 combines a remaining pattern image composed of dots larger than a minimum dot size readable by a color copying machine and a vanishing pattern image composed of dots having the same size as the larger dot and dots smaller than the minimum dot readable by the color copying machine to produce a reproduction checking image and causes the printing device 6 to print the reproduction checking image along with document print data on paper." (refer to Abstract).

Also, techniques for retraining not copying of paper documents, but copying of moving images have been proposed. For example, US Patent Application Publication 2006/0188012 specification describes "This invention relates to an apparatus for encoding data or the like, which disables the data to be copied in a condition where its good quality is maintained without deteriorating a quality of an output owing to the data before being copied. Synchronization signals VD and HD are separated from the analog image data Van are delayed and supplied to a clock generation circuit 1133 where a clock CLK is generated in a rage of an effective screen based on the synchronization signals. This clock signal CLK is shifted vertically and horizontally so that a phase of image data Vdg1 output from an A/D converter 1134 is also shifted. In this image data Vdg1, a signal-deteriorating factor is generated. An encoding section 1135 performs encoding by sampling, conversion encoding, and the like. By-shifting the phase of the image data Vdg1, a sampling position and/or a block position are caused to be shifted from a position where obtaining original encoding data relative to the image data Van1, thereby generating significant deterioration in the encoding section 1135." (refer to Abstract).

SUMMARY OF THE INVENTION

The above-described U.S. Pat. No. 7,359,087 specification describes the print control apparatus of the copy restrained images. However, this US Patent specification discloses the technique depending upon the dot size readable by the copying machine, and is restricted to restrain copying of the print matters. As a result, this technique cannot be applied in order that copying of still image data and moving image data are restrained, which are handled by PCs and the like.

Also, the above-described US Patent Application Publication 2006/0188012 describes the technique capable of disabling copying of image data while maintaining qualities of the image data before being copied. However, in order to realize the above-described technical idea, copying of the image data is necessarily required to be carried out in the image display system described in this US Patent Application Publication. Thus, if the above-explained image display system is not widely popularized, there is a problem that copying of image data cannot be brought into disable situations.

A specification of the present invention discloses a copying restraining technique which can be applied to image data handled in PCs (personal computers) and the like, while using software which is generally utilized.

More concretely speaking, the present specification discloses an emergable watermark superimposing method, an apparatus, or a system, which realizes the emergable watermark superimposing method. In the emergable watermark superimposing method, an emergable watermark as a copy indicator (merely referred to as "emergable watermark" hereinafter) is superimposed on an image in such a manner that when image data is tried to be converted based upon conversion software for the image data, the emergable watermark is converted with being emphasized, so that the above-explained converting action can be restrained.

In this case, the image data implies, for instance, still image data or moving image data. The conversion software implies, for example, software for decreasing a dimension (namely, total pixel numbers along lateral and longitudinal directions) of a still image or a moving image; and software for converting a compression format of still image data, or moving image data into another compression format.

In the above-described specification, as a technique for solving the above-described problems, for example, an emergable watermark superimposing method in an emergable watermark superimposing system is disclosed, while the emergable watermark superimposing method forms either a stego still image in which a superimposition image is superimposed on a cover still image or a stego moving image containing the stego still image.

Concretely speaking, the above-described emergable watermark superimposing method is featured by including:

a step in which when the stego still image is reduction-processed, a position of a pixel is acquired which gives an influence to a pixel value of the stego still image after being reduction-processed among pixels of the stego still image before being reduction-processed, a step for performing a clarifying process with respect to a pixel value of a pixel corresponding to the acquired position for giving the influence within pixels of the superimposition image which is superimposed on the cover still image in accordance with a predetermined parameter in such a manner that the superimposition image after being reduction-processed becomes clear;

a step for acquiring an adding/subtracting image with employment of the pixel value after the clarifying process is carried out; and a step for superimposing the adding/subtracting image on the cover still image to form a stego still image.

The above-described emergable watermark superimposing method may further include a step for preparing a changing strength of each of the pixel positions of the pixels which give the influence as the parameter, in which:

the step for performing the clarifying process includes a step for performing a calculation of a pixel value of a superimposition image and a changing strength, which are present at the pixel value.

The above-described emergable watermark superimposing method may further include a step for performing an unclarifying process with respect to a pixel value of a pixel other than the pixel which gives the influence in such a manner that the superimposition image before being reduction-processed becomes unclear; in which:

the step for acquiring the adding/subtracting image includes a step for acquiring the adding/subtracting image by employing the pixel after the clarifying process is performed and the pixel after the unclarifying process is carried out.

Also, the step for performing the unclarifying process may include a step for calculating either 0 or a random number and the pixel value of the superimposition image as to the pixels other than the pixel which gives the influence.

The step for performing the clarifying process of the above-described emergable watermark superimposing method may include a step for selecting pixel values of pixels which constitute a subject of a three-order convolution interpolating method within the pixels of the superimposition image in such a manner that a difference between pixel values of adjoining pixels of the stego still image after being reduction-processed becomes larger than a difference between the pixel values of the pixels which constitute the subject of the three-order convolution interpolating method in accordance with the predetermined parameter.

The step for performing the unclarifying process of the above-described superimposing method may include a step for selecting the pixel values of the superimposition image in such a manner that the difference between the pixel values of the pixels adjacent to each other does not become larger than a difference of original pixel values as a result of the reduction based upon the three-order convolution interpolating method.

Also, an emergable watermark superimposing system is disclosed which contains an emergable watermark superimposing server apparatus for executing the above-described method.

Concretely speaking, it is disclosed that the emergable watermark superimposing server apparatus receives a cover still image, a parameter, and a superimposition image as an input, and executes the above-described emergable watermark superimposing method to form either a stego still image or a stego moving image including the stego still image, which can be provided to a plurality of client apparatuses.

Also, an emergable watermark superimposing system is disclosed which has an emergable watermark superimposing server apparatus and an emergable watermark superimposing client apparatus, which execute the above-explained superimposing method.

Concretely speaking, an emergable watermark superimposing system is disclosed in that the emergable watermark superimposing server apparatus provides a cover still image, a parameter, and a superimposition image to the emergable watermark superimposing client apparatus; and the emergable watermark superimposing client apparatus executes the above-described emergable watermark superimposing method by employing the cover still image, the parameter, and the superimposition image, which are provided from the emergable watermark superimposing server apparatus, to form either a stego still image or a stego moving image including the stego still image.

Also, another emergable watermark superimposing system is disclosed which has an emergable watermark superimposing server apparatus and an emergable watermark superimposing client apparatus, which execute the above-explained superimposing method.

Concretely speaking, an emergable watermark superimposing system is disclosed in that the emergable watermark superimposing server apparatus provides a cover still image and a parameter to the emergable watermark superimposing client apparatus;

the parameter further contains a character string which is employed as a superimposition image; and the emergable watermark superimposing client apparatus forms the superimposition image from the character string provided from the emergable watermark superimposing server apparatus, and executes the above-described emergable watermark superimposing method by employing the cover still image, the parameter, and the superimposition image, which are provided from the emergable watermark superimposing server apparatus to form either a stego still image or a stego moving image containing the stego still image.

Also, a further emergable watermark superimposing system is disclosed which has an emergable watermark superimposing server apparatus and an emergable watermark superimposing client apparatus, which execute the above-explained superimposing method.

Concretely speaking, an emergable watermark superimposing system is disclosed in which the emergable watermark superimposing server apparatus provides a cover still image and a parameter to the emergable watermark superimposing client apparatus; and the emergable watermark superimposing client apparatus inclcudes a storage apparatus for storing thereinto a superimposition image, and executes the above-explained emergable watermark superimposing method by employing the cover still image and the parameter which are provided from the emergable watermark superimposing server apparatus, and the superimposition image stored in the storage apparatus to form either a stego still image or a stego moving image containing the stego still image.

Generally speaking, in case that an attacker illegally distributes image data via a moving image contributing site and the like on the Internet, a data conversion is performed in such a manner that a size of the image data is reduced. Since the emergable watermark superimposing method, the emergable watermark superimposing apparatus, or the emergable watermark superimposing system, which are disclosed in the specification of the present invention, can restrain the above-described data conversion, these superimposing method, apparatus, and system have an effect capable of restraining the above-explained illegal distribution of the image data.

Problems, configurations, and effects other than the above-described subject matters may become more obvious based upon descriptions of the below-mentioned embodiment modes.

Even in such a case that conversion software for image data is employed which is generally utilized, the emergable watermark superimposing method, the emergable watermark superimposing apparatus, or the emergable watermark superimposing system can be provided to images which are converted in such a manner that emergable watermarks are emphasized.

Other objects, features and advantages of the invention will become apparent from the following description of the embodiments of the invention taken in conjunction with the accompanying drawings.

BRIEF DESCRIPTION OF THE DRAWINGS

FIG. 11 is an explanatory diagram of an interpolation by a three-order convolution interpolating method.

FIG. 13A and FIG. 13B are explanatory diagrams for exemplifying images in which an emergable watermark emerges.

FIG. 14 is an explanatory diagram for exemplifying an image of a picture to which a strength of an emergable watermark is given.

DETAILED DESCRIPTION OF THE INVENTION

A description is made of embodiments according to the present invention with reference to drawings Firstly, some of technical terms are defined as follows:

Either a cover still image or a cover moving image is referred to as either a still image or a moving image, which constitutes a counter image to which an emergable watermark as a copy indicator is superimposed. There are some possibilities that these cover still image and moving image will be genetically called cover images. The above-described emergable watermark as the copy indicator will be merely referred to as an "emergable watermark" hereinafter.

Either a stego still image or a stego moving image is referred to as either a still image or a moving image after an emergable watermark has been superimposed. A dimension of the stego still image or the stego moving image is equal to that of a cover image. There are some possibilities that these stego still image and moving image will be generically called stego images.

An emergable watermark as a copy indicator implies the below-mentioned image: That is, although the above-described image is not clear in a stego image before being converted, when the stego image data is converted by conversion software for image data which is generally utilized, this image is emphasized to become more easily visible. A dimension of the emergable watermark is smaller than, or equal to that of a cover image, or a stego image.

A superimposition image implies an image which constitutes an original of an emergable watermark as a copy indicator. An adding/subtracting image is formed from a superimposition image based upon a conversion process (will be discussed later), and the adding/subtracting image is superimposed on a cover image, so that the superimposition image becomes an emergable watermark as a copy indicator. In other words, either a stego still image or a stego moving image corresponds to an image to which the superimposition image has been superimposed as the emergable watermark.

[Embodiment 1]

In an embodiment 1 of the present invention, a description is made of an example of an emergable watermark superimposing system in which while an emergable watermark is superimposed in an emergable watermark superimposing server apparatus, a moving image is provided to a plurality of client apparatuses which are utilized by viewers.

Figure 1:
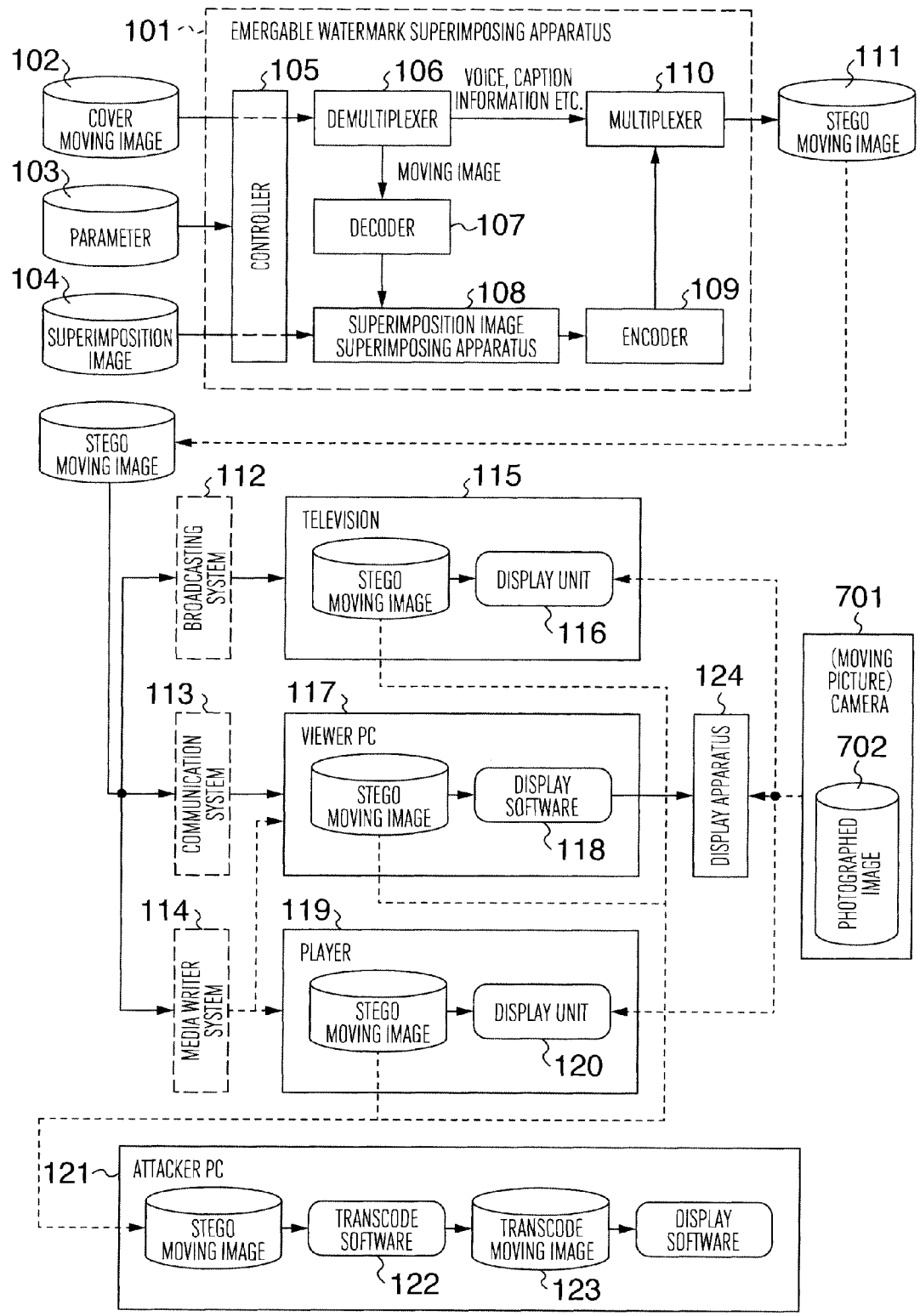
FIG. 1 is a diagram for exemplifying an arrangement of an emergable watermark superimposing system according to a first embodiment mode of an embodiment 1 of the present Invention.

FIG. 1 is a system structural diagram of the present embodiment 1.

An emergable watermark superimposing apparatus 101 corresponding to the emergable watermark superimposing server apparatus is an apparatus which receives a cover moving image 102, a parameter 103, and a superimposition image 104 as inputs, and outputs a resulting superimposed image as a stego moving image ill, which is obtained by superimposing the superimposition image 104 on the cover moving image 102 as an emergable watermark. The emergable watermark superimposing apparatus 101 is arranged by processing units which contain a controller 105, a demultiplexer 106, a decoder 107, a superimposition image superimposing unit 108, an encoder 109, and a multiplexer 110.

The cover moving image 102 is a moving image which constitutes a superimposing destination of an emergable watermark, and may alternatively contain additional information such as voice and a caption. The parameter 103 is data which defines processes of the emergable watermark superimposing apparatus 101, may have been previously prepared by a manual manner, or may have been alternatively stored in a storage apparatus 210 (will be explained later) such as a hard disk drive built in the superimposition image superimposing apparatus 108 when, the emergable watermark superimposing apparatus 101 is installed.

The controller 150 is a processing unit for controlling the emergable watermark superimposing apparatus 101. Although not especially indicated in the drawing, the controller 105 has been coupled to respective processing units which construct the emergable watermark superimposing apparatus 101. The demultiplexer 106 is a processing unit for deriving respective media from data into which moving images, voice, caption information, and the like are mixed, while the demultiplexer 106 is coupled to the decoder 107 and the multiplexer 110. The demultiplexer 106 transmits moving image data to the decoder 107, and data other than this moving image data to the multiplexer 110. The decoder 107 is an apparatus which decodes the moving image data so as to form a still image data stream, and is coupled to the superimposition image superimposing apparatus 108 and the demultiplexer 106.

The superimposition image superimposing apparatus 108 is an apparatus which superimposes a superimposition image on a cover image as an emergable watermark, and is coupled to the encoder 109 and the decoder 107. The encoder 109 is an apparatus which forms moving image data from a still image data stream, and is coupled to the superimposition image superimposing apparatus 108 and the multiplexer 110. The multiplexer 110 is an apparatus which forms data from respective media such as a moving image, voice, caption information, and the like, into which these media information are mixed, while the multiplexer 110 is coupled to the encoder 109 and the demultiplexer 106. The multiplexer 110 receives moving image data from the encoder 109, and receives data other than the moving image data from the demultiplexer 106 to form a stego moving image 111 into which these media information are mixed. The stego moving image 111 is a moving image on which an emergable watermark before emerging is superimposed.

The stego moving image 111 is provided via any one of paths made of a broadcasting system 112, a communication system 113, and a media writer system 114 to a client apparatus which is used by a viewer.

The broadcasting system 112 indicates an entire broadcasting system which includes various sorts of apparatuses defined from photographing apparatuses within television stations such as television cameras in television broadcast and the like, a transmitting apparatus, up to a receiving apparatus such as an antenna installed in a home of a viewer via either a wireless path or a wired path, while the broadcasting system 112 is coupled to a television 115 functioning as a client apparatus. The communication system 113 indicates such a communication system capable of downloading a moving image to a PC of the viewer and the like, corresponding to a stego moving image viewing apparatus, or streaming-viewing the moving image from a transmission source of this moving image via the Internet or the like in response to a request of the PC, while the communication system 113 is coupled to a viewer PC 117 functioning as a client apparatus. The media writer system 114 indicates an apparatus for writing the moving image data in storage type media such as DVDs and BDs, and a distributing system (physical distribution, retailing etc.).

The television 115 is a television which is used by the viewer. In the television 115, a display unit 116 corresponding to a component such as a liquid crystal screen for displaying the moving image data has been internally provided, and either a partial portion or an entire portion of the stego moving image 111 is internally reproduced before being transferred to the display unit 116. The viewer PC 117 is a PC which is used by the viewer, and can be operated as a viewing appliance based upon display software 118. It should be noted that an internal arrangement of the PC will be described later.

The display software 118 is software used to display a moving image downloaded, or streaming-distributed in the PC on a display apparatus 124, and the like.

The player 119 is a player functioning as a client apparatus which is used by the viewer in order to view the storage type media, while a display unit 120 has been internally provided. The display unit 120 is an apparatus such as a liquid crystal display, an output port, and the like in the player 119, which converts the moving image data in order to adapt the converted moving image data to a sense of sight of a human.

An attacker PC 121 is a PC which is used by an attacker, and is operated as a transcode appliance based upon transcode software 122, or is operated as a viewing appliance by display software 188. The transcode software 122 is software used to convert a data format of a moving image. The attacker PC 121 can convert the stego moving image 111 into a transcode moving image 123 corresponding to a moving image which is transcoded by an attacker based upon the transcode software 122.

Also, the attacker may alternatively photograph a moving image by employing a camera 701, which is displayed on any one, or more sets of the display unit 116, the display apparatus 124, and the display unit 120. In this alternative case, the attacker converts the stego moving image 111 into a photographed image 702 by photographing.

The system arrangement of the present embodiment 1 has been so far explained. While the above-explained system arrangement is one example, in an actual case, the respective apparatuses including the emergable watermark superimposing apparatus 101, the viewer PC 117, and the attacker PC 121 may be realized by employing PCs and software. Also, in an actual case, the respective apparatuses are not necessarily separated from each other as a single apparatus, but the plurality of apparatuses of FIG. 1 may be alternatively realized by a single PC in such a manner that a plurality of software are installed in the single PC, if required, and are properly switched, or are executed in a parallel manner.

Figure 2:
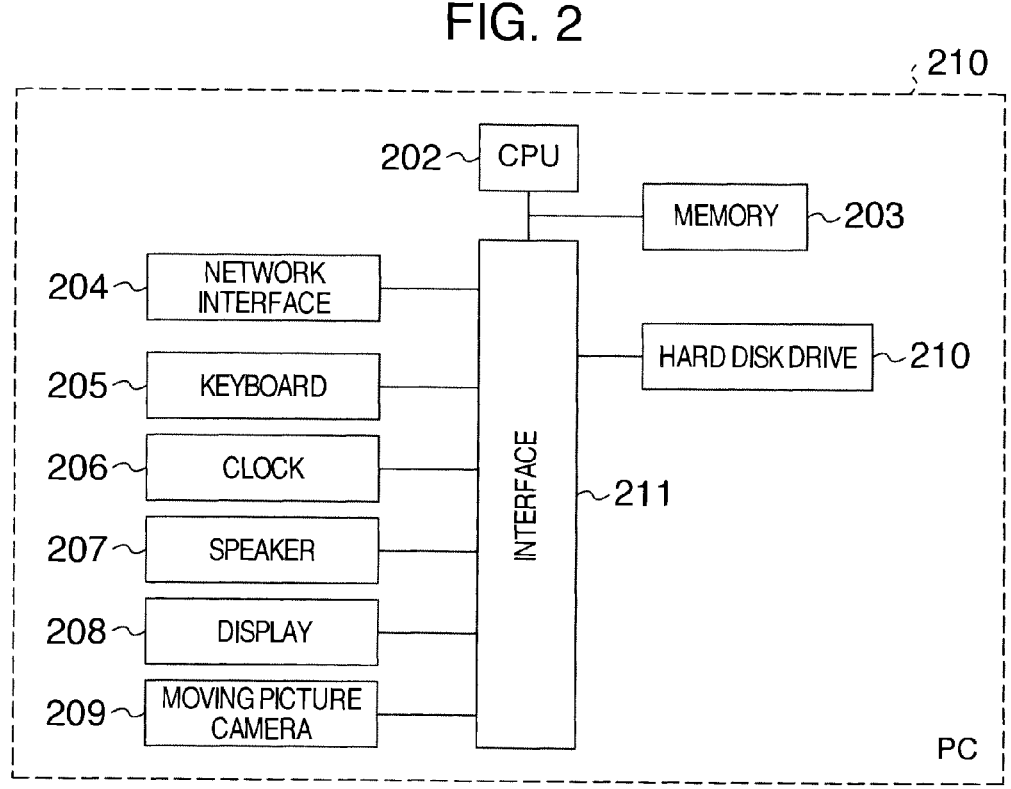
FIG. 2 is a diagram for showing an example of an internal structure of a general-purpose PC.

A description is made of one example of an internal structure of the above-described PC with reference to FIG. 2.

In FIG. 2, reference numeral 201 shows a PC, reference numeral 202 indicates a CPU, reference numeral 203 is a memory, reference numeral 204 shows a network interface, reference numeral 205 represents a keyboard, reference numeral 206 shows a clock, reference numeral 207 is a speaker, reference numeral 208 indicates a display, reference numeral 209 represents a moving picture camera, reference numeral 210 is a hard disk drive, and reference numeral 211 shows an interface.

While the PC 201 is a general-purpose PC, the PC 201 is configured by containing the CPU 202, the memory 203, the network interface 204, the keyboard 205, the clock 206, the speaker 207, the display 208, the moving picture camera 209, the hard disk drive 210, and the interface 211.

The CPU 202 is a central processing unit, and executes a program recorded in the memory 203, or a program read out from the hard disk drive 210 into the memory 203. Since the CPU 202 executes the programs, various sorts of processes (will be explained later) of the respective embodiments by the respective apparatuses are realized.

It should be understood that a program may be alternatively conducted by a storage medium which may be used by a PC and may be detachably mounted, if necessary. In this case, an apparatus for reading the above-described storage medium is coupled to the interlace 211. It should also be noted that as the above-described storage medium and apparatus for reading this storage medium, an apparatus which utilizes an optical disk is generally known, and this known apparatus may be employed. Also, a program may be conducted to the PC 201 via a communication medium (communication line, or carrier waves on communication line) by the network interface 204, if required. The CPU 202 is coupled to the memory 203 and the interface 211.

The memory 203 is an apparatus which temporarily stores thereinto a program executed by the CPU 202 and data. The network interface 204 is an apparatus used to communicate with an apparatus outside the PC 201 such as another PC. The keyboard 205 is an apparatus which, is operated by an operator of the PC 201 in order to issue an instruction and input data to the PC 201. The clock 206 is an apparatus by which the CPU 202 approximately grasps the present time. The speaker 207 is an apparatus which reproduces a signal as sound. The display 208 is an apparatus which displays thereon a processed result and the like. The moving picture camera 209 is an apparatus which inputs a moving image as a signal into the PC 201.

The hard disk drive 210 is an apparatus which stores thereinto a program and data, and can be configured by, for example, a non-volatile memory, a magnetic disk apparatus, or the like, in this case, the program and the data stored in the hard disk drive 210 are normally held even in case that a power supply is turned OFF and thereafter ON. It should also be noted that an operating system may have been previously conducted to the hard disk drive 210. Since the operating system has been previously conducted, a program may be designated by employing a file name. In this case, the operating system is basic software of a computer, and such operating systems which are widely popularized may be employed. The interface 211 is an appliance used to couple with apparatuses provided within the PC 201, and is coupled to the CPU 202.

Figure 3:
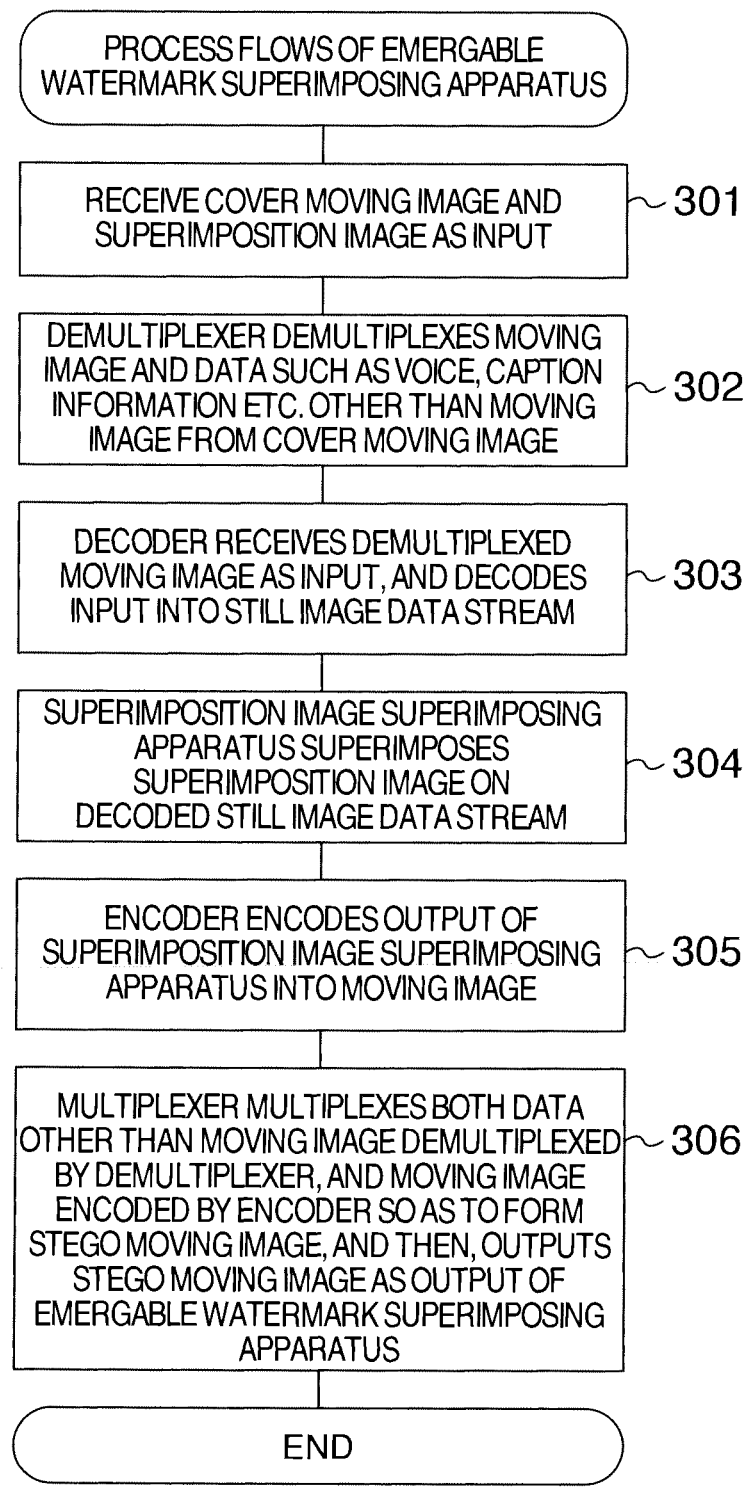
FIG. 3 is a flow chart for exemplifying an outline of processes of an emergable watermark superimposing apparatus according to a first embodiment mode of the embodiment 1.

Next, a description is made of process flows of the emergable watermark superimposing apparatus 101 with reference to FIG. 3.

FIG. 3 is a diagram for showing the process flows of the emergable watermark superimposing apparatus 101.

This is a flow chart for indicating an outline of processes of the emergable watermark superimposing apparatus 101 of the first embodiment mode, A step 301 is a process for receiving the cover moving image 102 and the superimposition image 104 as an input. For instance in case that the emergable watermark superimposing apparatus 101 is constituted by the PC 201 having the structure of FIG. 2, this input receiving process can be executed by recording the cover moving image 102 and the superimposition image 104 in the hard disk drive 210 via the network interface 204. Alternatively, as previously described, in case that the cover moving image 102 and the superimposition image 104 have been recorded on the detachable storage medium such as an optical disk, the input receiving process may be executed by that an apparatus used to read the above-described storage medium is coupled to the interface 211 so as to read the cover moving image 102 and the superimposition image 104, and these read image 102 and 104 are recorded in the hard disk drive 210, if necessary.

A step 302 is a process in which the demultiplexer 106 demultiplexes a moving image and data other than the moving image, such as voice and caption information, from the cover moving image 102. Since the cover moving image 102 is formed in accordance with a multimedia container format such as, for example, MPEG-2 PS, the moving image is demultiplexed therefrom.

A step 303 is a process in which the decoder 107 receives the demultiplexed moving image as an input, and decodes the received moving image so as to be converted to a still image data stream. While the moving image is formed in accordance with the format such as, for instance, MPEG-2, this moving image is received via a network interface 204 (not shown) of the decoder 107, and then, is recorded in a hard disk drive 210 (not shown) of the decoder 107. The decoder 107 decodes this moving image to be converted into either a single still image data stream or a plurality of still image streams.

A step 304 is a process in which the superimposition image superimposing apparatus 108 superimposes the superimposition image 104 on the decoded still image data stream. A detailed description of the above-described process will be made later.

A step 305 is a process in which the encoder 109 encodes an output of the superimposition image superimposing apparatus 108 to obtain a moving image. While the output of the superimposition image superimposing apparatus 108 is, for example, either the single still image data stream or the plurality of still image data streams, the encoder 109 receives this still image data stream, or streams via, for instance, a network interface 204 (not shown) of the encoder 109 and records the received still image data stream, or streams in a hard disk drive 210 (not shown) of the encoder 109. The encoder 109 encodes the received data stream of the still image to obtain, for example, a moving image of MPEG-2 etc.

A step 306 is a process in which the multiplexer 110 multiplexes the images other than the moving image demultiplexed by the demultiplexer 106 with the moving image encoded by the encoder 109 so as to form a stego moving image 111, and then, outputs the formed stego moving image 111 as an output of the emergable watermark superimposing apparatus 101.

The multiplexer 110 receives, for example, the data other than the moving image via a network interface 204 (not shown) of the multiplexer 110, also, the multiplexer 110 receives, for instance, the encoded moving image via the network interface 204 of the multiplexer 110, and records the data and the encoded moving image in a hard disk drive 210 (not shown) of the multiplexer 110 respectively. Next, the multiplexer 110 multiplexes the data with the encoded moving image, and converts the multiplexed data/moving image in a format of, for example, MPEG-2 TS to output the converted moving image/data. The output moving image/data may be recorded in the hard disk drive 210 of the multiplexer 110, or may be alternatively transmitted through the network interface 204 of the multiplexer 110 to another apparatus in response to a request.

While the explanation about the processes of the emergable watermark superimposing apparatus 101 has been so far accomplished, the below-mentioned alternative processes may be alternatively executed. That is, the above-explained processes may be alternatively carried out, for example, every 1 second, or 10 seconds etc., otherwise, in the unit of a GOP (Group Of Pictures), or every a certain cluster, and then, these processes may be performed in a repetition manner. With execution of the above-explained alternative processes, the response times of the emergable watermark superimposing apparatus 101 may be decreased. Concretely speaking, when the processes are performed in the unit of, for instance, a cluster of 1 second, in case that a presently readily available PC is employed, the processes of the emergable watermark superimposing apparatus 101 do not require so large loads, so that approximately 1 second of the response time may be achieved. Among moving images, contents over long time are present, for instance, a movie for 2 hours and the like. As a consequence, since such a device is employed, the response time may be improved from approximately 2 hours to, for example, about 1 second (in case that cluster is sectioned every 1 second).

Figure 4:
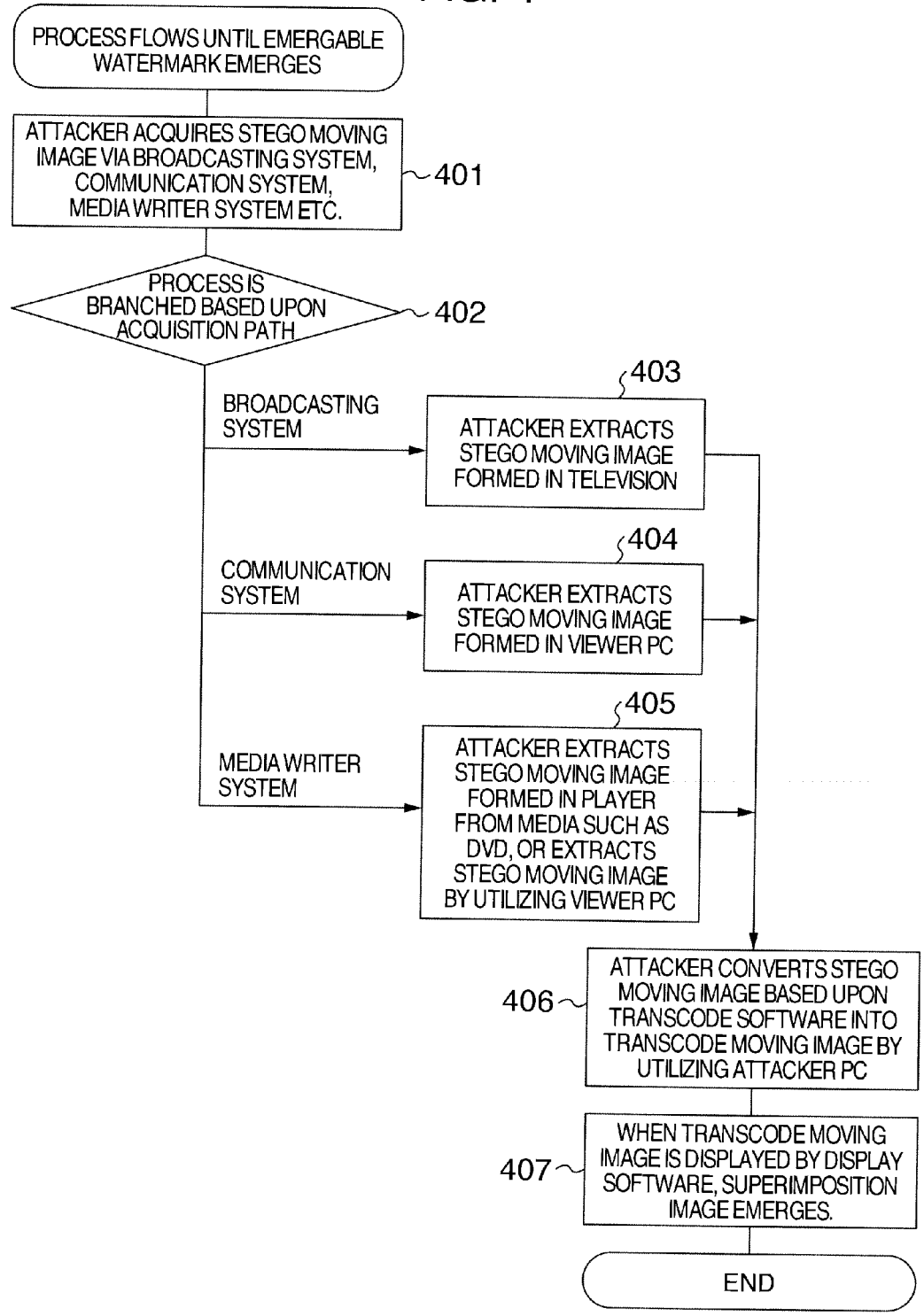
FIG. 4 is a flow chart for exemplifying an outline of process flows until a superimposition image superimposed as an emergable watermark as a copy indicator emerges in the first embodiment mode.

Next, a description is made of process flows until a superimposed emergable watermark emerges in the present embodiment 1 with reference to FIG. 4.

FIG 4 is a diagram for indicating the process flows until the emergable watermark emerges.

This is a flow chart for exemplifying an outline of the process flows until the superimposition image superimposed as the emergable watermark in the emergable watermark superimposing apparatus 101 emerges A step 401 is a process in which an attacker acquires a stego moving image 111 via the broadcasting system. 112, the communication system 113, the media writer system 114, and the like.

In a step 402, the process is branched, depending upon an acquisition path. If the acquisition path, is the broadcasting system 112, then the process is advanced to a step 403. If the acquisition, path is the communication system 11.3, then the process is advanced to a step 404. If the acquisition path is the media writer system 114, then the process is advanced to a step 405.

The step 403 is a process in which the attacker extracts the stego moving image 111 formed in the television 115. Thereafter, the process flow is advanced to a step 406.

The step 404 is a process in which the attacker extracts the stego moving image 111 formed in the viewer PC 117. Thereafter, the process flow is advanced to the step 406.

The step 405 is a process in which the attacker extracts the stego moving image 111 formed in the player 119 from media such as a DVD, or extracts the stego moving image 111 by utilizing the viewer PC 117. Thereafter, the process flow is advanced to the step 406.

The step 406 is a process in which the attacker converts the stego moving image 111 into a transcode moving image 123 based upon the transcode software 122 by utilizing the attacker PC 121.

Also, the attacker may alternatively photograph such a result which displays the acquired stego moving image 111 by utilizing the television 115, the player 119, the viewer PC 117, and the like by employing the camera 701. Since the photographing implies that the display result is recorded in the same resolution as that employed when the display result is displayed, or different resolution from the last-mentioned resolution, this implies that the attacker has executed processes equivalent to the step 402 to the step 406 by the photographing.

In this case, as the conversion process, for example, a reduction process is conceivable.

In a step 407, if the attacker displays the transcode moving image 123 based upon the display software 118, then a superimposition image 104 emerges. While FIG. 13A and FIG. 13B are exemplification diagrams, FIG. 13A indicates a stego still image before emerging, and FIG. 13B represents a still image after the superimposition image 104 emerges as the emergable watermark. In this example, such a character of "Prohibition of copying" has been previously-superimposed as the superimposition image 104. It should be understood that in this case, the expression of "emerging" does not imply that the superimposition image 104 directly appears, but implies that the superimposition image 104 may be viewed by being furthermore emphasized, as compared with the stego still image.

As previously explained, a warning image such as "Prohibition of copying", "Prohibition of transmitting to the Internet", and the like has been previously formed as the superimposition image 104, and the formed warning image has been superimposed as an emergable watermark, so that the warning can be issued with respect to the attacker who has performed the transcoding. It should also be noted that the basic idea related to emerging of the superimposition image 104 will be discussed later.

The explanations as to the flow processes until the superimposition image 104 superimposed in the emergable watermark superimposing apparatus 101 as the emergable watermark emerges have been so far accomplished.

Next, a description is made of the process of the step 304 in which the superimposition image superimposing apparatus 108 superimposes the superimposition image 104 on the decoded still image data stream as the emergable watermark with employment of FIG, 5.

Figure 5:
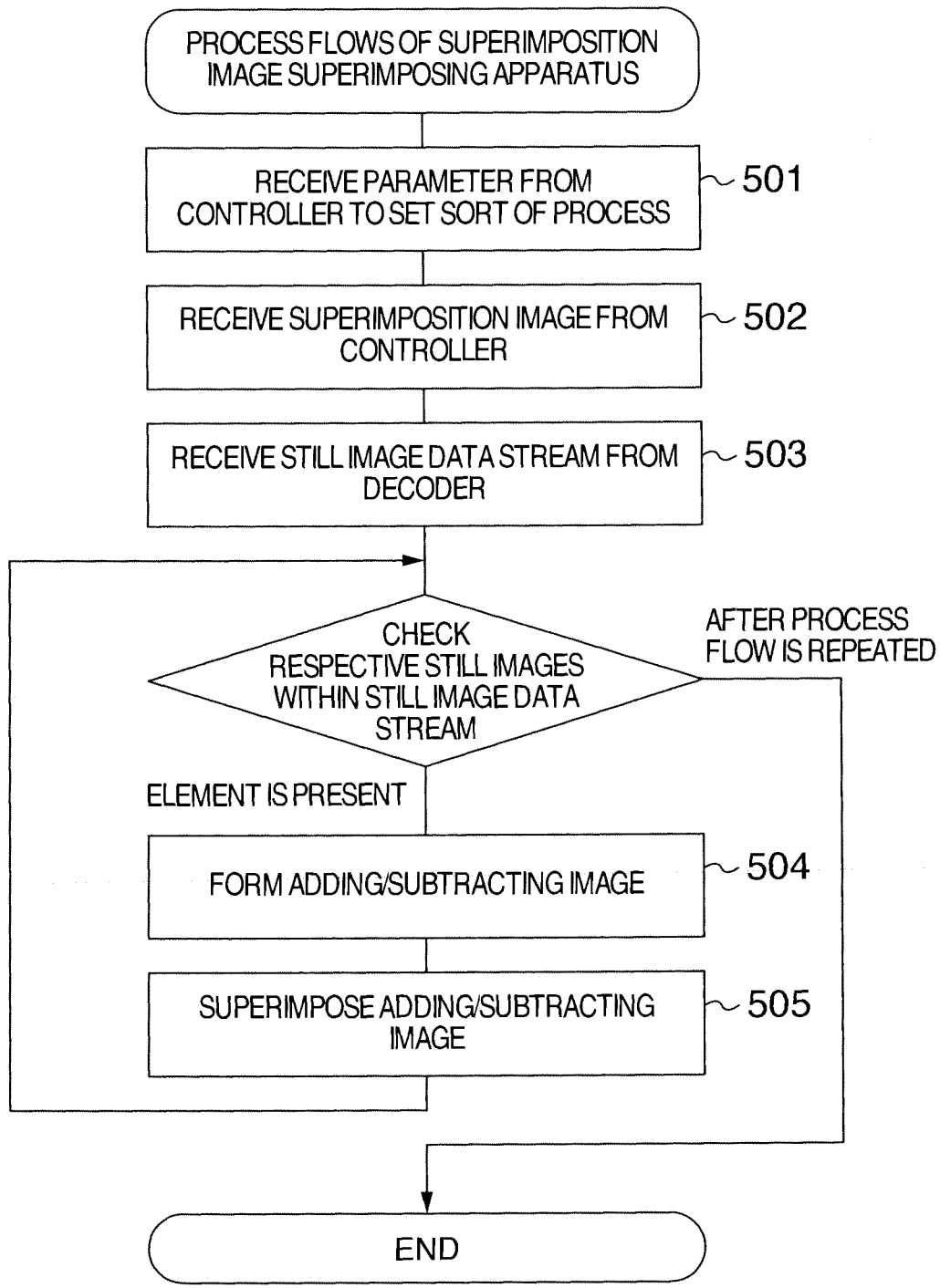
FIG. 5 is a flow chart for exemplifying an outline of processes of a superimposition image superimposing apparatus according to the first embodiment mode.

FIG. 5 is a diagram for indicating process flows of the superimposition image superimposing apparatus 108.

This is a flow chart for showing an outline of the processes of the superimposition image superimposing apparatus 108 of the first embodiment mode.

A step 501 is a process in which the superimposition image superimposing apparatus 108 receives the parameter 103 from the controller 105 to set a sort of processes. As a concrete receiving method, for example, the below-mentioned method is present: That is, the parameter 103 is received via a network interface 204 (not shown) of the superimposition image superimposing apparatus 108, and then, the received parameter 103 is recorded in a hard disk drive 210 (not shown) of the superimposition image superimposing apparatus 108. As the parameter 103 to be received, there are a reduction ratio, and the below-mentioned changing strength.

A step 502 is a process in which the superimposition image superimposing apparatus 108 receives the superimposition image 104 from the controller 105. As a concrete receiving method, for example, the below-mentioned method is present: That is, the superimposition image 104 is received via the network interface 204 of the superimposition image superimposing apparatus 108, and then, is recorded in the hard disk drive 210 of the superimposition image superimposing apparatus 108.

A step 503 is a process in which the superimposition image superimposing apparatus 108 receives the cover still image data stream from the decoder 107. As a concrete receiving method, for example, the below-mentioned method is present: That is, the cover still image data stream is received via the network interface 204 of the superimposition image superimposing apparatus 108, and then, is recorded in the hard disk drive 210 of the superimposition image superimposing apparatus 108. Subsequently, a step 504 and a step 505 are repeated plural times equal to a total number of a plurality of cover still images which are contained in the still image data stream.

The step 504 is a process in which the superimposition image superimposing apparatus 108 forms an adding /subtracting image. It should be understood that the adding/subtracting image is an image adjusted in such a manner that if this adding/subtracting image is added to the cover still image, then the superimposition image 104 is superimposed as an emergable watermark, and thus, the resulting superimposed image becomes a stego still image. A detailed description, of this process will he made later.

The step 505 is a process in which the superimposition image superimposing apparatus 108 superimposes the adding/subtracting image The superimposition of the adding/subtracting image is performed by a method for adding the adding/subtracting image with respect to a luminance component of the cover still image. In this case, the addition implies that with respect to a luminance component of each pixel of a cover still image, a value (plus, zero, or minus) of each pixel of an adding/subtracting image corresponding thereto; and in case that an adding/subtracting image is smaller, as compared with a cover still image, the above-explained addition is performed by that the adding/subtracting image is repeatedly spread within the cover still image to add the pixel values, it should be noted that as a result, when an added pixel value exceeds a maximum, value which is allowed in each pixel, or becomes smaller than an allowable minimum value, the luminance value of the pixel after the addition is defined as either the allowable maximum value or the allowable minimum value. It should also be noted that the allowable maximum value is typically 255, and the allowable minimum value is typically 0.

In the case of another typical example in which the cover still image is represented by integers from 0 to 255 of the respective R, G, B, luminance values may be alternatively converted as follows: That is, firstly, numeral values of the R, G, B are converted into real numbers of, Y, Cb, and Cr in the below-mentioned calculating manner:

$$Y = 0.29891 \times R + 0.58661 \times G + 0.11448 \times B$$

$$Cb = -0.16874 \times R - 0.33126 \times G + 0.50000 \times B$$

$$Cr = 0.50000 \times R - 0.41869 \times G - 0.08131 \times B$$

Thereafter, the adding/subtracting image is added with respect to Y which represents the luminance. Subsequently, the numeral values of Y, Cb, Cr are converted into real numbers of the R, G, B in the below-mentioned calculating manner:

$$R = Y + 1.40200 \times Cr$$

$$G = Y - 0.34414 \times Cb - 0.71414 \times Cr$$

$$B = Y + 1.77200 \times Cb$$

Finally, these real numbers may be converted so as to be expressed by the integers from 0 to 255, respectively. In this case, when the real numbers are converted into the integers from 0 to 255, the below-mentioned converting manner may be alternatively employed: That is, for example, after the real numbers are converted by rounding off one place of decimals of each of the numeral values, these integers may be alternatively converted in such an assumption that a numeral value smaller than 0 is defined as 0, and a numeral value larger than 255 is defined as 255.

After this process is carried out, in such a case that an unprocessed image is still present in the plurality of cover still images contained in the still image data stream, the process flow is returned to the step 504. When the processes for all the cover still images are accomplished, the process flow is completed.

Figure 6:
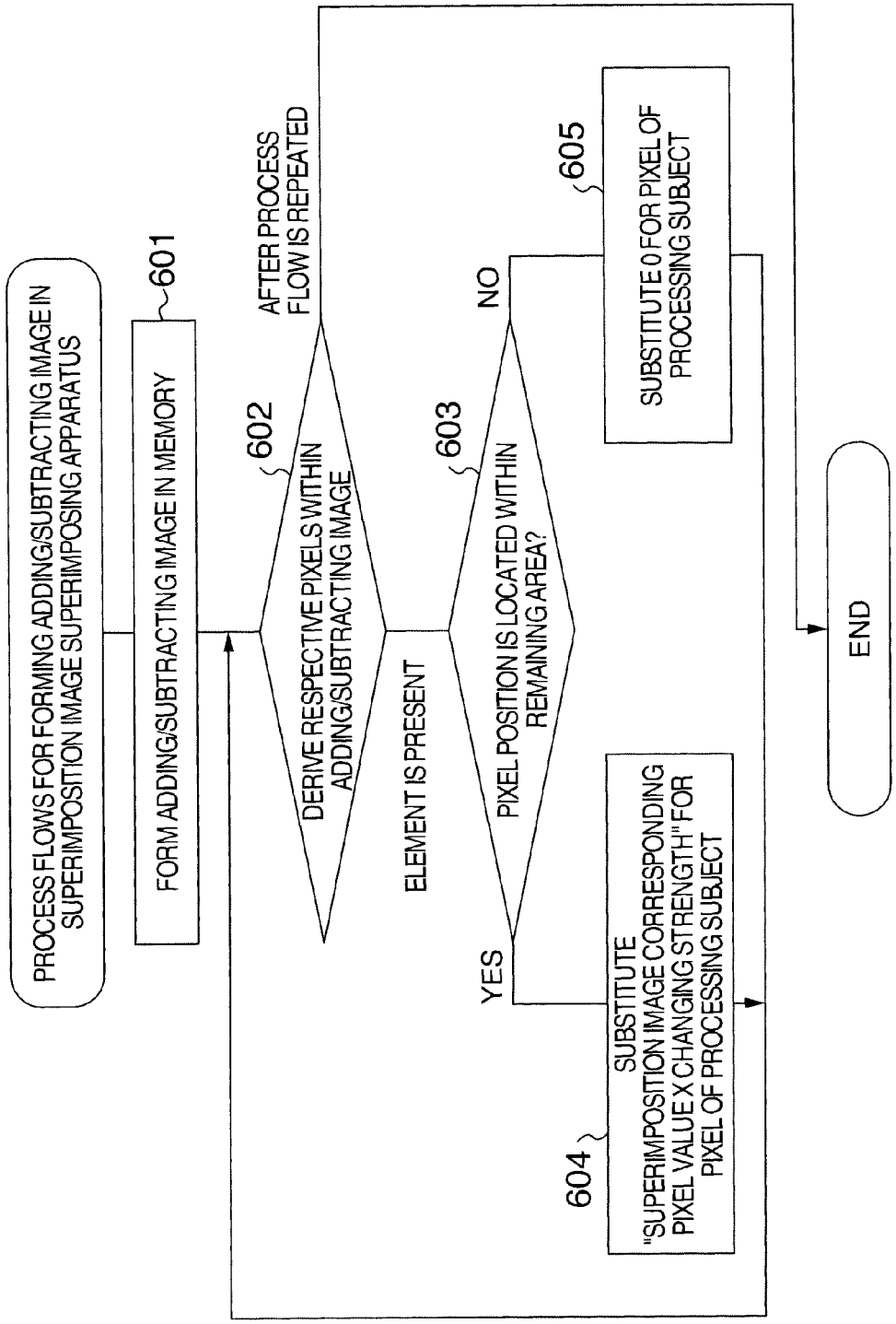
FIG. 6 is a diagram for exemplifying a process flow for forming an adding/subtracting image in the superimposition image superimposing apparatus of the first embodiment mode.

Next, a detailed description is made of the adding/subtracting image forming process by the superimposition image superimposing apparatus 108 in the step 504 with reference to FIG. 6.

FIG. 6 is a diagram for showing process flows of forming the adding/subtracting image in the superimposition image superimposing apparatus 108.

This is a diagram for indicating flows as to the adding/subtracting image forming processes in the superimposition image superimposing apparatus 108 of the first embodiment mode.

A step 601 is a process in which the superimposition image superimposing apparatus 108 forms an adding/subtracting image in a memory 203 (not shown) within the superimposition image superimposing apparatus 108 as a working-purpose memory region. The adding/subtracting image is an image having the same dimension as that of the superimposition image 104, and values of the respective pixels have typically values of 256 gradation from −128 to +127. It should be noted that, for instance, the respective pixel values may alternatively have real numbers.

A step 602 is a process in which the superimposition image superimposing apparatus 108 derives respective pixels within the adding/subtracting image If there is a pixel which has not yet been processed, then the process flow is advanced a step 603. After the processes have been carried out with respect to the respective pixels, the process flow is accomplished.

The step 603 is a process in that the superimposition image superimposing apparatus 108 checks whether or not a position of a pixel of a processing subject is located within a remaining area. In this case, the remaining area implies such an area configured by pixels when the image is reduced by the reduction ratio given in the step 501, while the pixels give influences to pixel values of the image after being reduced.

For example, in case that the nearest-neighbor interpolating method is employed as the reducing process, pixels which do not give an influence to an image after being reduced are present in an image before being reduced. This reason is given as follows: That is, in the nearest-neighbor interpolating method, in the image after being reduced, a value of any one of pixels of the image before being reduced is employed, and on the other hand, in the image after being reduced, numbers of pixels are originally decreased, as compared with those of the image before being reduced. As a consequence, such an operation for thinning pixels is carried out with intuition.

A judgement whether or not a position of a pixel is present within the remaining area can be performed when the position of the pixel of the processing subject (namely, image before being reduced) is defined as "(x, y)", the reduction ratio is defined as "a (<1.0)", the integer constants are defined as "c1" and "c2", and a function for giving the maximum integer which does not exceed "x" is defined as "int (x)" in the below-mentioned manner.

If there are integers (u, v) which become "int ((2u+1)/2a)+c1=x" and "int ((2v+1)/2a)+c2=y", and furthermore, the integers "(u, v)" are the pixel position contained in the image after being reduced, then the position of the pixel is determined to be within the remaining area It should be understood that in the above condition, the integer constants "c1" and "c2" take, for example, values from 0 to approximately 15, and may have the same value, or the different values. This is a parameter contained in the parameter 103, which is provided in case that the remaining area is moved in a parallel mode; and as one example, the parameter may be changed one by one from 0 to 15 along either a temporal direction or a spatial direction of a moving image, otherwise, the parameter may be alternatively changed by one value at random. Since the above-explained parameter is changed in the above-described manner, even when the remaining area is moved in the parallel mode, a portion from which the emergable watermark emerges can be formed. It should also be noted that the integer constants "c1" and "c2" may alternatively have larger values, or smaller values than the above-described values, for instance, have 100, −15, −100.

If the pixel position of the processing subject is located within the remaining area, then process flow is advanced to a step 604. If the pixel position of the processing subject is not located within the remaining area, then the process flow is advanced to a step 605.

The step 604 is a process in which the superimposition image superimposing apparatus 108 substitutes a "superimposition image corresponding pixel value×a changing strength" for the pixel of the processing subject. This process is referred to as a "clarifying process", and is designed in that an influence of a superimposition image is given to a stego image in order that an emergable watermark emerges.

In this case, the changing strength implies such a value for determining how degree a superimposition image gives an influence to a stego image in what strength. In case that an absolute value of a changing strength is large, an influence given by a superimposition image to a stego image is increased, so that when an emergable watermark emerges, the emergable watermark may be more clearly viewed. Also, in case that an absolute value of a changing strength is small, an influence given by a superimposition image to a stego image is decreased, so that the emergable watermark may not become more conspicuous in a stego image before such a reduction is carried out by which an emergable watermark emerges.

It should be understood that in addition to such a case that the changing strength gives one numeral value contained in the parameter 103, for example, as shown in FIG. 14, a plurality of changing strengths may be alternatively arranged as an image having the same dimension as that of the superimposition image 104 so as to be given as the parameter 103. It is assumed that the dimension of the superimposition image 104 is defined as 5×5 pixels for the sake of convenience in FIG. 14. While the superimposition image 104 typically has a dimension larger than, or equal to 100 pixels along the lateral and longitudinal directions. FIG. 14 is an exemplification diagram for the explanation purpose. Since the plurality of changing strengths are given in the above-described manner, the below-mentioned operations can be canned out, namely, a changing strength of a portion is increased where a superimposition image is wanted to be strongly superimposed, whereas a changing strength of a portion is decreased where a superimposition image is wanted to be weakly superimposed.

Furthermore, the changing strength may be alternatively and dynamically produced in coincident with the superimposition image 104. In this case, for example, the data value of the watermark core image 912 disclosed in U.S. Pat. No. 6,584,210 may be used, and a numeral value produced by multiplying an inverse number of this data value by a constant may also be alternatively used. In the former case, such an effect may be achieved that an emergable watermark is strongly superimposed at a place where the emergable watermark can hardly emerge, and thus, the emergable watermark may easily emerge over an entire screen. In the latter case, such an effect may be achieved that an emergable watermark is not excessively-superimposed at a place where the emergable watermark can hardly emerge so as to prevent a deterioration of an image quality, and the emergable watermark is strongly superimposed at a place where the emergable watermark may easily emerge, so that the emergable watermark may more easily emerge.

The step 605 is a process in which the superimposition image superimposing apparatus 108 substitutes 0 for pixels which are not located within the remaining area in order that the emergable watermark before being reduced can be hardly recognized. This process is referred to as an "unclarifying process", by which the emergable watermark does not emerge. It should be noted that instead of 0, a "random number×changing strength" may be alternatively substituted. Since the above-described unclarifying process is carried out a superimposition image before emerging may be more hardly viewed, so that the unclarifying effect may be emphasized. FIG. 13A is an example in case that this "random number x changing strength" is substituted. It should be understood that as the random number employed in this example, a pseudo-random number which is generally utilized may be employed. It should also be noted that this pseudo-random number is calculated by the CPU 202 of the superimposition image superimposing apparatus 102. Also, in case where the pseudo-random number is employed, as an initial value of the pseudo-random number, for example, the time (time in unit of microsecond is desirable) when a process is commenced, and the like may be employed.

As so far described, the description of the process flows for forming the adding/subtracting image in the superimposition image superimposing apparatus 108 is accomplished.

In this connection, a supplementary explanation is made of a basic idea about emerging of the superimposition image 104 in the step 407.

In the step 603, a check is made whether or not a pixel position of a processing subject is located within the remaining area. If the pixel position is located within the remaining area, then the clarifying process for changing the pixel value is carried out in order that the superimposition image 104 becomes clear after the reducing process is performed in the step 604. If the pixel position is not located within the remaining area, then the process flow is advanced to the step 605 in which the unclarifying process is carried out for the pixel value in order that the superimposition image 104 can be hardly recognized before the reducing process is performed. As a result, in the original stego image, the pixel value of the superimposition image 104 is added and subtracted, or not, so that the superimposition image 104 is not clear.

On the other hand, in case that a stego image is reduced and an image after being reduced is formed based upon the pixels of the remaining area, since the image after being reduced is configured based upon the clarifying-processed pixels within the superimposition image 104, the value of the superimposition image 104 becomes clear.

In an actual case, due to a very small difference in reduction ratios and an error of a floating point calculation, there are some possibilities that original pixels of the pixels after being reduced are not formed only by the pixels of the remaining area. However, when a ratio of the pixels of the remaining area is larger, as compared with those of the original stego moving image, the superimposition image 104 becomes clearer than the original stego moving image.

[Embodiment 2]

Figure 7:
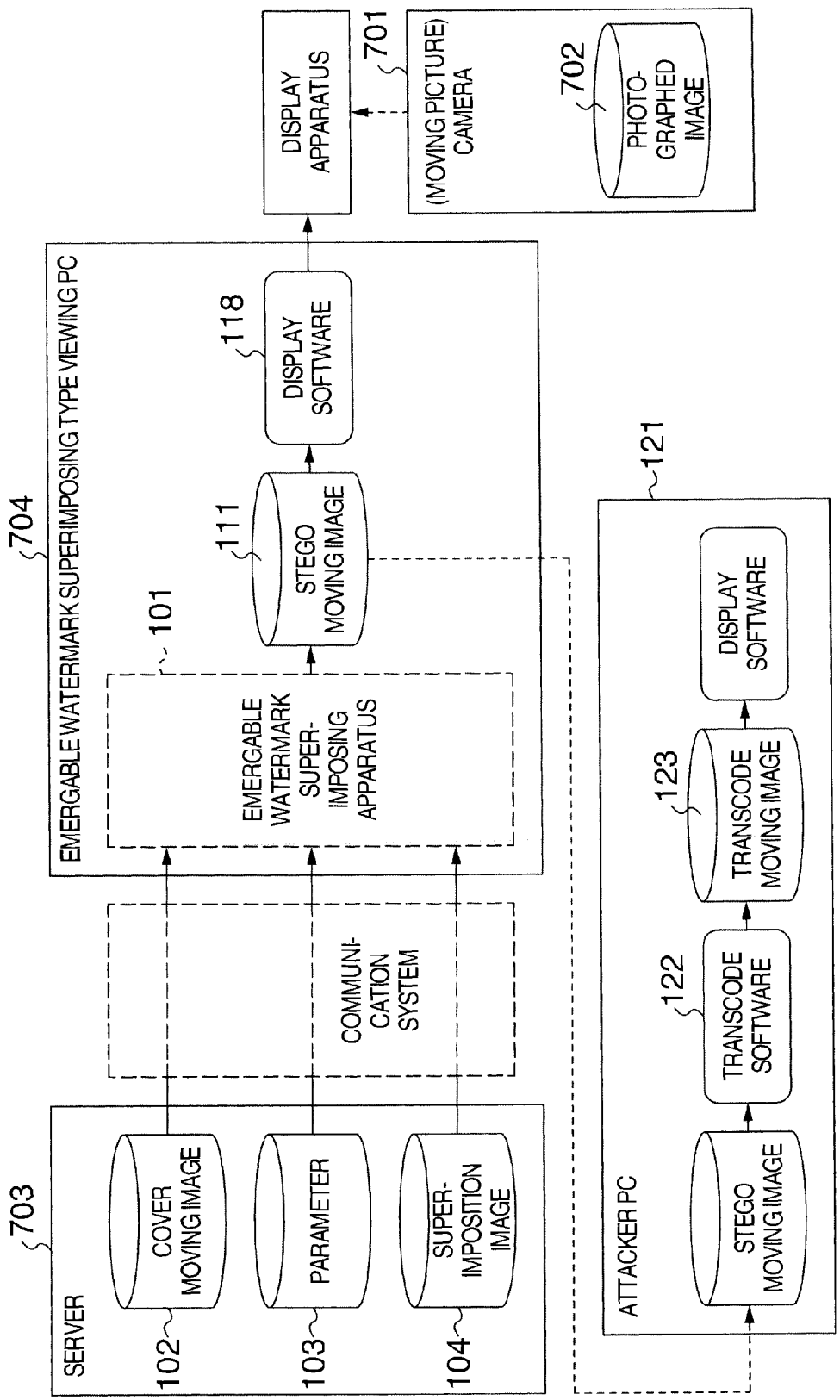
FIG. 7 is a diagram for showing one example of an arrangement of an emergable watermark superimposing system according to a second embodiment mode of the embodiment 1.

In an embodiment 2 of the present invention, a description is made of such a type of emergable watermark superimposing system which superimposes an emergable watermark after a moving image has been distributed to a viewer FIG. 7 is a system structural diagram which is constructed by containing a server 703 functioning as an emergable watermark superimposing server apparatus, and an emergable watermark superimposing type viewing PC 704 functioning as an emergable watermark superimposing client apparatus.

In this drawing, reference numeral 701 is a camera, and reference numeral 702 is a photographed image. Also, the emergable watermark superimposing type viewing PC 704 of the present embodiment 2 is realized by containing the emergable watermark superimposing apparatus 101 and the display software 118, which are explained in the embodiment 1. It should be noted that the emergable watermark superimposing apparatus 101 may be alternatively realized by employing software. In this alternative case, the software of the emergable watermark superimposing apparatus 101 may be executed by a CPU 202 (not shown) of the emergable watermark superimposing type viewing PC 704, so that mounting of the hardware which requires relatively higher cost may be avoided. Also, a communication system 113 and an attacker PC 121 are identical to those explained in the embodiment 1. While a cover moving image 102, a parameter 103, and a superimposition image 104 have been stored in a hard disk-drive (not shown) of the server 703, or the like, these cover moving image 102, parameter 103, and superimposition image 104 are distributed via the communication system 113 to the emergable watermark superimposing type viewing PC 704. The server 703 can be configured by utilizing the PC shown in FIG. 2, which is similar to the superimposition image superimposing apparatus 108.

When a distribution is performed, for example, if a viewing request is issued from the emergable watermark superimposing type viewing PC 704 functioning as the emergable watermark superimposing client apparatus to the server 703 via an interface of Web etc., then the server 703 distributes the cover moving image 102, the parameter 103, and the superimposition image 104 to the emergable watermark superimposing type viewing PC 704. In this case, any one, or more items of the cover moving image 102, the parameter 103, and the superimposition image 104 may be alternatively and further encrypted. In this alternative case, after the emergable watermark, superimposing type viewing PC 704 decrypts the distributed cover moving image 102, parameter 103, and superimposition image 104, the decrypted cover moving image 102, parameter 103, and superimposition image 104 are inputted to the emergable watermark superimposing apparatus 101. It should also be noted that a key which is employed in the encryption may be alternatively employed when a user is registered and the like, and then, may be alternatively transmitted to the emergable watermark superimposing type viewing PC 704.

The camera 701 is either a moving picture camera or a still image camera. Either a moving image or a still image photographed by the camera 701 is stored as the photographed image 702 in either a memory (not shown) or a hard disk drive (not shown) within the camera 701, a flash memory, an optical recording medium etc. In the present embodiment 2, it is assumed that the photographed image 702 is such an image obtained by that an attacker photographs the stego moving image 111 displayed on a display apparatus by employing the camera 701.

Figure 8:
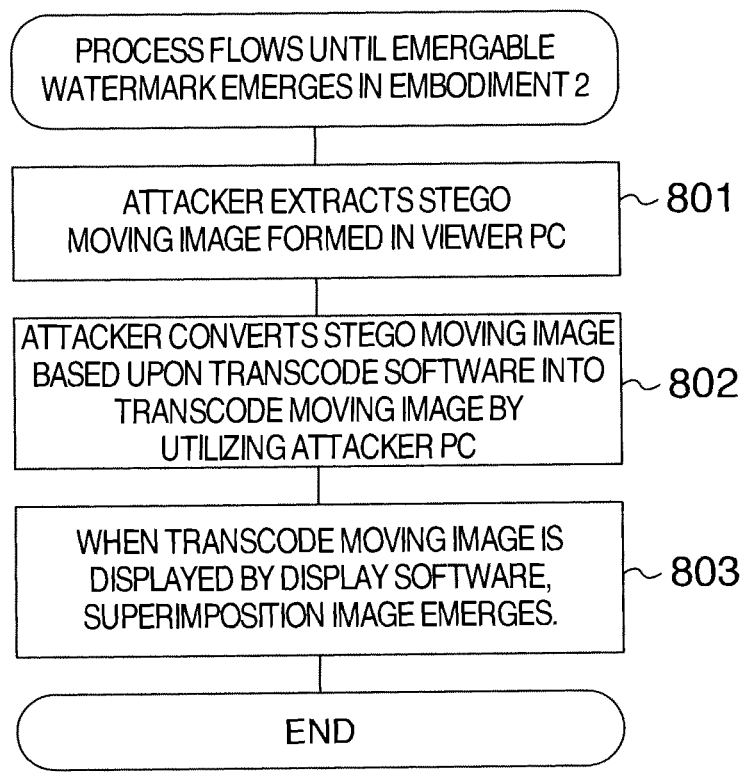
FIG. 8 is a flow chart for exemplifying an outline of process flows until a superimposition image superimposed as an emergable image emerges in an embodiment 2 of the present invention.

In the present embodiment 2, an emergable watermark emerges in accordance with process flows as shown in FIG. 8.

FIG. 8 is a diagram for indicating the process flows until the emergable watermark emerges in the embodiment 2.

This is a flow chart for exemplifying an outline of the process flows until a superimposition image superimposed as the emergable watermark emerges in the embodiment 2.

A step 801 is a process in which an attacker extracts a stego moving image 111 which is formed in the emergable watermark superimposing type viewing PC 704, A step 802 is a process in which the attacker converts the stego moving image 111 into a transcode moving image 123 based upon the transcode software 122 by utilizing the attacker PC 121.

A step 803 is a process in which when the attacker displays the transcode moving image 123 based upon the display software 118, the superimposition image 104 superimposed as the emergable watermark emerges. It should be understood that in this case, the expression of "emerging" does not imply that the superimposition image 104 directly appears, but implies that the superimposition image 104 may emerge with being furthermore emphasized, as compared with the stego moving image 111.

Also, even in case that the attacker photographs the stego moving image 111 displayed on the display apparatus by employing the camera 701, since the transcode is produced, there are some possibilities that the superimposition image 104 emerges in the photographed image 702.

In the embodiment 1, before the moving image is distributed via the broadcasting system 112, the communication system 113, the media writer system 114, and the like, the stego moving image 111 is formed in the emergable watermark superimposing apparatus 101. As a result, the embodiment 1 is suitably utilized in such a case that the same stego moving image is distributed to a large number of viewers.

On the other hand, in the embodiment 2, after the cover moving image is distributed via the communication system 113 to the emergable watermark superimposing type viewing PC 704 which is utilized by the viewer, the stego moving image 111 is formed in the emergable watermark superimposing apparatus 101. As a result, the embodiment 2 is suitably utilized in such a case that different superimposition images are superimposed with respect to the respective viewers. At this time, as a superimposition image, a character string capable of specifying a viewer such as an ID and a name of the viewer may be employed. In this case, the viewer has previously performed a user registration.

Alternatively, when a character string is employed as a superimposition image, the superimposition image is not distributed from the server 703, but the character string may be contained in the parameter 103, and this character string may be processed as an image by the emergable watermark superimposing type viewing PC 704, so that this superimposition image may be formed. As a result, a communication amount and a process amount of the server 703 may be reduced. Imaging of the character string may be carried out by employing functions which are provided by a general-purpose Windows system, and a general-purpose OS (Operating System) integrated with the Windows system.

[Embodiment 3]

In an embodiment 3 of the present invention, a description is made of an emergable watermark superimposing system which is especially adapted to an image reducing system based upon the three-order convolution interpolating method.

Figure 9:
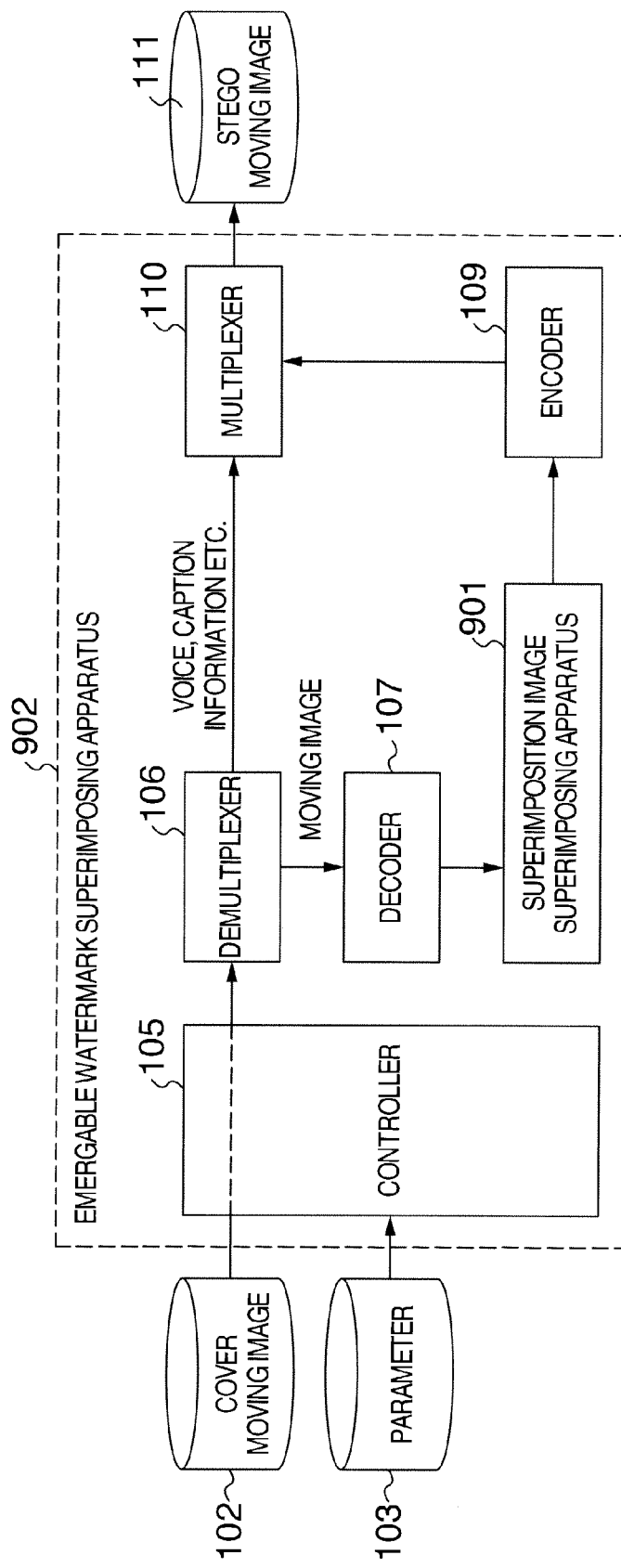
FIG. 9 is a diagram for exemplifying an outline of process flows of an emergable watermark superimposing apparatus according to an embodiment 3 of the present invention.

FIG. 9 is a diagram for showing the emergable watermark superimposing system according to the embodiment 3. Similar to the embodiment 1, FIG. 9 is an example of the emergable watermark superimposing system in which while an emergable watermark is superimposed in an emergable watermark superimposing server apparatus, moving images are provided to a plurality of client apparatuses which are utilized by viewers.

In this drawing, reference numeral 901 is a superimposition image superimposing apparatus, and reference numeral 902 is an emergable watermark superimposing apparatus corresponding to the emergable watermark superimposing server apparatus in the present embodiment 3.

The superimposition image superimposing apparatus 901 is an apparatus which produces an emergable watermark to be superimposed on a cover image.

The emergeable watermark superimposing apparatus 902 in the present embodiment 3 has a different configuration from that of the superimposition image superimposing apparatus 901 which does not input a superimposition image, as compared with the emergable watermark superimposing apparatus 101 of the embodiment 1.

Figure 10:
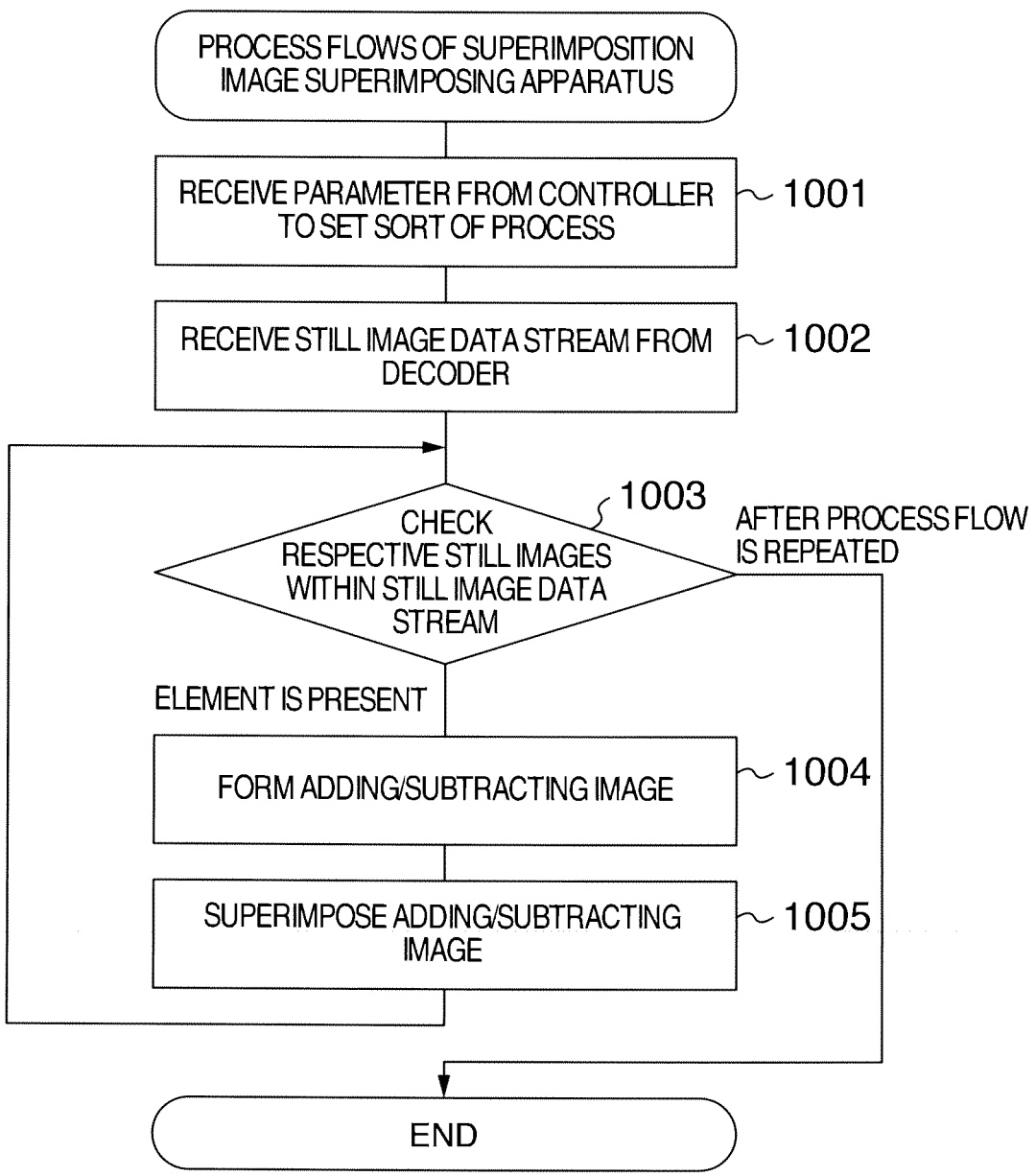
FIG. 10 is a flow chart for exemplifying an outline of process flows of a superimposition image superimposing apparatus according to an embodiment mode of the embodiment 3.

Referring to FIG. 10, a description is made of processes of the superimposition image superimposing apparatus 901

FIG. 10 is a diagram of process flows of the superimposition image superimposing apparatus 901.

This is a flow chart for showing an outline of the processes of the superimposition image superimposing apparatus 901 according to an embodiment mode.

A step 1001 is a process in which a parameter 103 is received from the controller 105 to set a sort of processes. As the parameter 103, a dimension (x, y) of a block and a changing strength are present.

A step 1002 is a process in which a still image data stream is received from the decoder 107. It should be noted that, for example, while the still image data stream is received via a network interface 204 (not shown) of the superimposition image superimposing apparatus 901, the received still image data stream is stored in a hard disk drive 210 (not shown) of the superimposition image superimposing apparatus 901.

A step 1003 is a process in which each of still images within the still image data stream is derived. If there is a still image which has not yet been processed, then the process flow is advanced to a step 1004. After processes for the respective still images are ended, the process flow is accomplished.

A step 1004 is a process in which an adding/subtracting image is formed

In the present embodiment 3, as a superimposition image which is superimposed on a cover still image, a checkered pattern is employed. Forming of an adding/subtracting image is carried out based upon the block dimension of (x, y) in the step 1001 in the below-mentioned manner. That is, firstly, as the adding/subtracting image, a region having the same size as that of the cover still image is formed in a memory 203 (not shown) of the superimposition image superimposing apparatus 901. Next, assuming that a position of a pixel of the adding/subtracting image is (u, v), if mod (int (u/x), 2) is equal to mod (int (v/y), 2), then a pixel of a position corresponding to the superimposition image is assumed as "1", and a value of an adding/subtracting image at this pixel position is defined as a changing strength. If mod (int (u/x), 2) is not equal to mode (int v/y), 2), then a pixel of a position corresponding to the superimposition image is assumed as "0", and a value of an adding/subtracting image at this pixel position is assumed as "0." As a result, a clarifying process of the superimposition image corresponding to the checkered pattern can be carried out.

It should be noted that mod (x, y) is a function which gives the remainder when "x" is divided by "y", and int (x) is a function which gives a maximum integer which does not exceed "x."

A step 1005 is a process in which the adding/subtracting image is superimposed. With respect to a luminance value of each pixel of the still image, a value of the adding/subtracting image located at the same position is added. As to a method for adding the value to the luminance value, a method similar to that of the above-described step 505 may be employed.

A supplementary explanation is made of a basic idea of the above-explained processes.

In the present embodiment 3, while the stego image is formed in such a manner that the emergable watermark emerges when the image is reduced based upon the three-order convolution interpolating method, an interpolation based upon the three-order convolution interpolating method is originally such a calculating method by employing image data of 16 circumferential points as shown in FIG. 11 in accordance with the below-mentioned formula (1): (Reference Publication: Robert G. Keys, "Cubic Convolution Interpolation for Digital Image Processing," IEEE Transaction, on Acoustics, Speech, and Signal Processing, Volume Assp-29, No. 6, pages 1153 to 1160, December 1981).

$$P(u,v) = [\, f((l-1)-v) \quad f(l-v) \quad f((l+1)-v) \quad f((l+2)-v)\,] \quad (1)$$

-continued
$$\begin{bmatrix} P_{k-1,l-1} & P_{k,l-1} & P_{k+1,l-1} & P_{k+2,l-1} \\ P_{k-1,l} & P_{k,l} & P_{k+1,l} & P_{k+2,l} \\ P_{k-1,l+1} & P_{k,l+1} & P_{k+1,l+1} & P_{k+2,l+1} \\ P_{k-1,l+2} & P_{k,l+2} & P_{k+1,l+2} & P_{k+2,l+2} \end{bmatrix} \begin{bmatrix} f((k-1)-u) \\ f(k-u) \\ f((k+1)-u) \\ f((k+2)-u) \end{bmatrix}$$

note that
$$f(t) = \begin{cases} 1 - 2|t|^2 + |t|^3, & 0 \le |t| < 1 \\ 4 - 8|t| + 5|t|^2 - |t|^3, & 1 \le |t| < 2 \\ 0, & 2 \le |t| \end{cases}$$

Figures 12A, 12B:
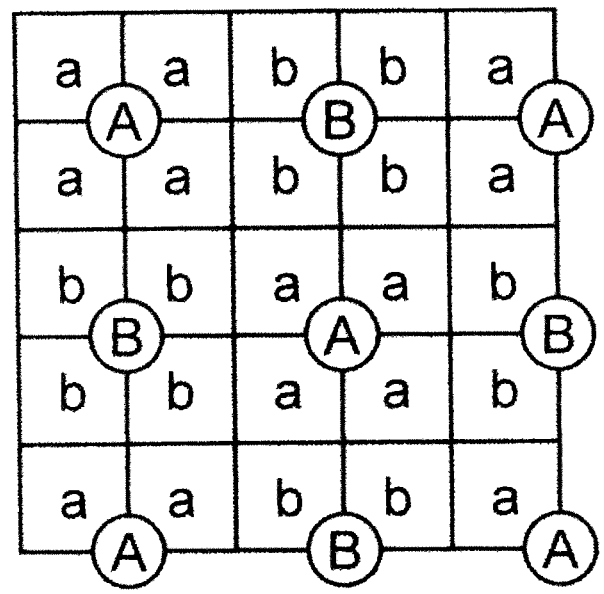
FIG. 12A and FIG. 12B are diagrams for exemplifying an arrangement of sampling points when a ½-reduction is performed by the three-order convolution interpolating method.

In this method, a description is made of such a case that (x, y)=(2, 2) with reference to FIG. 12A and FIG. 12B. FIG. 12A and FIG. 12B are diagrams for representing an arrangement of sampling points when a ½ reduction is performed based upon the three-order convolution interpolating method. Each of squares of FIG. 12A and FIG. 12B expresses a still image before being reduced, and each of circles expresses a pixel of a still image after being reduced by ½. After the still images are reduced by ½, a total pixel number becomes ½ along longitudinal and lateral directions. A circle is positioned at a center of squares of 4 rectangles.

Assuming now that a reduction of ½ occurs and sampling points become as represented in FIG. 12A and FIG. 12B, since the reduction based upon the three-order convolution interpolating method becomes u=k+0.5, and v=1+0.5 in the above-described formula, and then, when a calculation is performed, this calculation can give the same effect achieved by that a 4×4 filter as indicated in FIG. 12B is applied to the original image around the respective sampling points.

When numeral values of entire 4×4 filters within the filter are added to each other, the resulting value is 64, and becomes 1 by 1/64 coefficients in the entire area.

Now, an attention is paid to 4 elements located at a center of the 4×4 filter. Since these 4 elements are "+25", if "+25" is totalized, then it becomes "100", namely exceeds "64." This indicates that contributions by these 4 elements at the center are large, and thus, the totalized value becomes an emphasized value, as compared with that of the original image As a consequence, as written in the squares of FIG. 12 A, when such values as "a" and "b" are repeated every "2×2", values of "A" and "B" after the reduction are given as A=(104a−40b)/64, and B=(104b−40a)/64, since values of 4 points in the vicinity of these "A" and "B" are emphasized. In other words, it becomes A−B (144/64)×(a−b), and thus, it is possible to grasp that a difference of the original image is multiplied by 144/64=2.25.

While the present embodiment 3 utilizes the above-described phenomenon, in the case of (x, y)=(2, 2), in the step 1004, since the checkered pattern is used as the superimposition image, the difference which is not conspicuous before the reduction may emerge by being multiplied by 2.2 after the reduction.

Figure 15A:
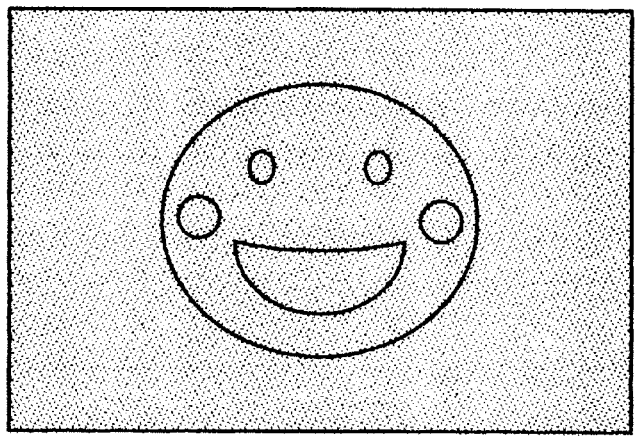
FIG. 15A to FIG. 15C are explanatory diagrams for exemplifying images in which emergable watermarks of checkers emerge.
Figure 15B:
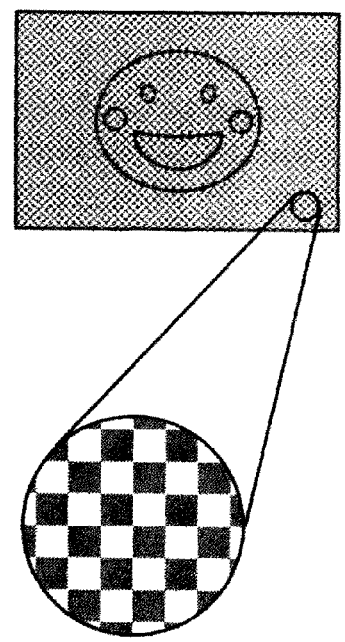
Figure 15C:
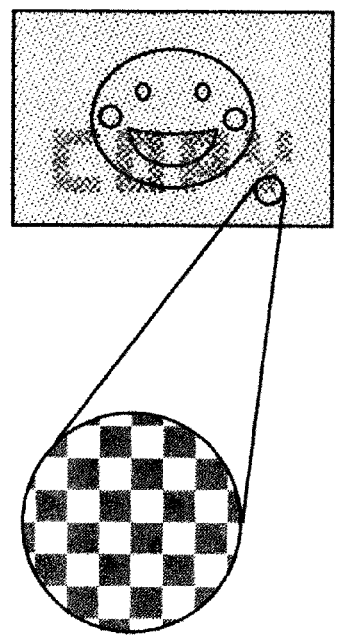

FIG. 15A to FIG. 15C represent stego moving images and images when an emergable watermark emerges. FIG. 15A shows a stego moving image before the emergable watermark emerges; FIG. 15B is an image example 1 after the emergable watermark emerges; and FIG. 15C is an image example 2 after the emergable watermark emerges. As shown in FIG. 15B, a checkered pattern may emerge over an entire portion of the image. Since the above-described process is performed, qualities of the images are lowered, so that non-permitted copying by an attacker can be restrained.

Alternatively, as shown in FIG. 15C, the checkered pattern may be partially caused to emerge, and a certain character, or a certain pattern may be formed by employing the emerging checkered pattern. Since the above-explained process is performed, a message of "COPY" etc. may be more clearly represented to the attacker. In order to execute the above-described process, the superimposition image superimposing apparatus 901 furthermore receives such a superimposition image which indicates that the emergable watermark is caused to emerge at which pixel, and caused not to emerge at which pixel in the step 1001; the superimposition image superimposing apparatus 901 judges whether or not a pixel corresponds to the pixel for causing the emergable watermark to emerge based upon a value of a superimposition image corresponding to the pixel position of the processing subject in the step 1004; and furthermore, if the pixel is a portion where the emergable watermark is not wanted to emerge, then the adding/subtracting image may be kept in a constant value irrespective of "u" and "v" in the step 1004.

More concretely speaking, the adding/subtracting image may be set to, for example, ½ of the changing strength and so on. This is equal to the unclarifying process. It should be noted that if the pixel is the pixel which causes the emergable watermark, then the previously explained process of the step 1004 may be continuously performed.

Although the respective parameters 103 have been fixed in the above-described embodiments 1 to 3, a plurality of adding/subtracting images having different parameters in either the temporal direction or the spatial direction of the moving image may be alternatively superimposed. Since the plurality of adding/subtracting images are superimposed, the emergable watermarks may be caused to emerge with respect to various sorts of reduction ratios, for example, a 1/2 reduction ratio, a 1/3 reduction ratio, a 2/3 reduction ratio etc.

For instance, the above-described processes may be realized by the following methods, namely in either the embodiment 1 or the embodiment 2, the reduction ratio given in the step 501 may be changed, or the reduction ratio employed in the step 603 may be sequentially employed from a plurality of values, and the like. Also, for instance, in the embodiment 3, the above-described processes may be realized by the following methods, namely, both "x" and "y" given in the step 1001 may be changed, or both "x" and "y" given in the step 1004 may be sequentially employed from a plurality of values, and the like.

It should be understood that as typical values as reduction ratios, there are the below-mentioned reduction ratios by which 1920 lateral pixels×1080 longitudinal pixels are reduced to the below-explained pixels: 256 lateral pixels×144 longitudinal pixels (1/7.5 reduction); 512 lateral pixels×288 longitudinal pixels (1/3.75 reduction); 768 lateral pixels×432 longitudinal pixels (1/2.5 reduction); 1024 lateral pixels×576 longitudinal pixels (1/1.875 reduction); 1280 lateral pixels× 720 longitudinal pixels (1/1.5 reduction); and 1536 lateral pixels×864 longitudinal pixels (1/1.25 reduction). It should also be noted that such reduction ratios which are different from each other in lateral and longitudinal directions may be alternatively employed as reduction ratios, for example, 1920 lateral pixels×1080 longitudinal pixels may be alternatively reduced to 640 pixels*480 pixels etc.

Alternatively, the embodiment 1 may be mixed with the embodiment 3 among the above-described embodiments. With execution of this alternative process, a place where an emergable watermark emerges by the reduction of the three-order convolution interpolating method may be mixed with another place where the emergable watermark emerges by another reducing system.

It should be understood that various sorts of modifications may be alternatively-realized which are not limited to the above-described embodiments. For example, the present invention is not limited only to systems equipped with all the configurations explained in the above-described embodiments. Also, a portion of configurations of a certain embodiment may be replaced by configurations of another embodiment. Alternatively, with respect to the configurations of the certain embodiment, configurations of another embodiment may be additionally provided. Further, as to a portion of configurations of each embodiment, other configurations may be alternatively added, deleted, or replaced.

Also, either a portion or an entire portion of the above-described configurations, functions, processing units, and the like may be realized by hardware which is designed by, for example, an integrated circuit. Further, the above-explained respective configurations, functions, and the like may be alternatively realized based upon software by that a processor interprets and executes a program for realizing the respective functions. The information such as the program for realizing the respective functions, tables, and files may be stored in a recording apparatus such as a memory, a hard disk drive, and an SSD (Solid-State Device), or in a storage medium such as an 1C card, an SD card, and a DVD Also, while control lines and information lines are indicated which are conceivable to be required for the sake of explanations, this is not limited to such a condition that all control lines and all information lines are necessarily indicated in view of a product. In an actual case, it is conceivable that almost all of configurations are coupled to each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An emergable watermark superimposing method for an emergable watermark superimposing system which forms at least one of a stego still image in which a superimposition image is superimposed on a cover still image and a stego moving image containing the stego still image, comprising:
    when the stego still image is reduction-processed, acquiring a position of a pixel which influences a pixel value of the stego still image after being reduction-processed, the pixel being among pixels of the stego still image prior to the stego still image being reduction-processed, the position being acquired by using a maximum integer function and inputting a reduction ratio and an integer constant to produce a maximum integer;
    changing the pixel value of a pixel corresponding to the acquired position of the pixel influencing the pixel value, the pixel whose pixel value is changed being among pixels of the superimposition image, which is superimposed on the cover still image in accordance with a predetermined parameter such that the superimposition image becomes clear after being reduction-processed;
    acquiring an adding/subtracting image with employment of the pixel value after the pixel value is changed; and
    superimposing the adding/subtracting image on the cover still image to form the stego still image.

2. The emergable watermark superimposing method as claimed in claim 1, further comprising:
    preparing a changing strength of each of pixel positions of pixels which influence the pixel value, the changing strength corresponding to the predetermined parameter; wherein:

changing the pixel value comprises performing a calculation of a pixel value of a superimposition image and a changing strength associated with the pixel value.

3. The emergable watermark superimposing method as claimed in claim 1, further comprising:
unclarifying a pixel value of a pixel other than the pixel which is influential such that the superimposition image becomes unclear before being reduction-processed; wherein:
acquiring the adding/subtracting image comprises acquiring the adding/subtracting image by employing the pixel after the pixel value is changed and the pixel after the unclarifying is carried out.

4. The emergable watermark superimposing method as claimed in claim 3, wherein:
unclarifying of the pixel value comprises calculating either 0 or a random number and the pixel value of the superimposition image for pixels other than the pixel influencing the pixel value.

5. The emergable watermark superimposing method as claimed in claim 1, wherein:
changing the pixel value comprises selecting pixel values of pixels which comprise a subject of a three-order convolution interpolation among the pixels of the superimposition image, such that a difference between pixel values of adjacent pixels of the stego still image after being reduction-processed becomes larger than a difference between the pixel values of the pixels which comprise the subject of the three-order convolution interpolation, in accordance with the predetermined parameter.

6. The emergable watermark superimposing method as claimed in claim 5, wherein:
unclarifying the pixel value comprises selecting the pixel values of the superimposition image such that the difference between the pixel values of the pixels adjacent to each other does not become larger than a difference of original pixel values as a result of reduction based upon the three-order convolution interpolation.

7. An emergable watermark superimposing system which forms at least one of a stego still image in which a superimposition image is superimposed on a cover still image and a stego moving image containing the stego still image, comprising:
an emergable watermark superimposing server apparatus configured to:
receive the cover still image, a predetermined parameter, and the superimposition image as an input,
then, when the stego still image is reduction-processed, acquire a position of a pixel which influences a pixel value of the stego still image after being reduction-processed, the pixel being among pixels of the stego still image prior to the stego still image being reduction-processed, the position being acquired by using a maximum integer function and inputting a reduction ratio and an integer constant to produce a maximum integer,
after acquiring the position, change the pixel value of a pixel corresponding to the acquired position of the pixel influencing the pixel value, the pixel whose pixel value is changed being among pixels of the superimposition image which is superimposed on the cover still image in accordance with a predetermined parameter such that the superimposition image becomes clear after being reduction-processed,
then acquire an adding/subtracting image with employment of the pixel value after the pixel value is changed, and
superimpose the adding/subtracting image on the cover still image to form the at least one of a stego still image and the stego moving image including the stego still image, such that the at least one of the stego still image and the stego moving image is available to a plurality of client apparatuses.

8. An emergable watermark superimposing system which forms at least one of a stego still image in which a superimposition image is superimposed on a cover still image and a stego moving image containing the stego still image, comprising:
an emergable watermark superimposing server apparatus configured to provide a cover still image, a parameter, and a superimposition image to an emergable watermark superimposing client apparatus, the emergable watermark superimposing client apparatus being configured to:
when the stego still image is reduction-processed, acquire a position of a pixel which influences a pixel value of the stego still image after being reduction-processed, the pixel being among pixels of the stego still image prior to the stego still image being reduction-processed, the position being acquired by using a maximum integer function and inputting a reduction ratio and an integer constant to produce a maximum integer,
after acquiring the position, change the pixel value of a pixel corresponding to the acquired position of the pixel influencing the pixel value, the pixel whose pixel value is changed being among pixels of the superimposition image which is superimposed on the cover still image in accordance with a predetermined parameter such that the superimposition image becomes clear after being reduction-processed,
then acquire an adding/subtracting image with employment of the pixel value after the pixel value is changed, and
superimpose the adding/subtracting image on the cover still image to form the at least one of a stego still image and the stego moving image including the stego still image.

9. An emergable watermark superimposing system which forms at least one of a stego still image in which a superimposition image is superimposed on a cover still image and a stego moving image containing the stego still image, comprising:
an emergable watermark superimposing server apparatus; and
an emergable watermark superimposing client apparatus, the emergable watermark superimposing server apparatus being configured to provide a cover still image and a predetermined parameter to the emergable watermark superimposing client apparatus, wherein:
the parameter contains a character string which is employed as a superimposition image,
the emergable watermark superimposing client apparatus is configured to:
form the superimposition image from the character string provided from the emergable watermark superimposing server apparatus,
when the stego still image is reduction-processed, acquire a position of a pixel which influences a pixel value of the stego still image after being reduction-processed, the pixel being among pixels of the stego still image prior to the stego still image being reduction-processed, the position being acquired by using a maximum integer function and inputting a reduction ratio and an integer constant to produce a maximum integer, after acquiring the position, change the pixel value of a pixel corresponding to the acquired position of the pixel influencing the pixel value, the pixel whose pixel value is changed being among pixels of the superimposition image which is superimposed on the cover still image in accordance with a predetermined parameter such that the superimposition image becomes clear after being reduction-processed, then acquire an adding/subtracting image with employment of the pixel value after the pixel value is changed, and superimpose the adding/subtracting image on the cover still image to form the at least one of the stego still image and the stego moving image including the stego still image.

10. An emergable watermark superimposing system which forms at least one of a stego still image in which a superimposition image is superimposed on a cover still image and a stego moving image containing the stego still image, comprising:

an emergable watermark superimposing server apparatus; and an emergable watermark superimposing client apparatus, the emergable watermark superimposing server apparatus being configured to provide a cover still image and a predetermined parameter to the emergable watermark superimposing client apparatus, and wherein the emergable watermark superimposing client apparatus includes a storage apparatus for storing a superimposition image therein, and is configured to:

when the stego still image is reduction-processed, acquire a position of a pixel which influences a pixel value of the stego still image after being reduction-processed, the pixel being among pixels of the stego still image prior to the stego still image being reduction-processed, the position being acquired by using a maximum integer function and inputting a reduction ratio and an integer constant to produce a maximum integer, after acquiring the position, change the pixel value of a pixel corresponding to the acquired position of the pixel influencing the pixel value, the pixel whose pixel value is changed being among pixels of the superimposition image which is superimposed on the cover still image in accordance with a predetermined parameter such that the superimposition image becomes clear after being reduction-processed, then acquire an adding/subtracting image with employment of the pixel value after the pixel value is changed, and superimpose the adding/subtracting image on the cover still image to form the at least one of the stego still image and the stego moving image including the stego still image.

* * * * *